(12) United States Patent
Anderson et al.

(10) Patent No.: US 8,180,368 B2
(45) Date of Patent: *May 15, 2012

(54) FEMTO-CELL LOCATION BY DIRECT METHODS

(75) Inventors: Robert J. Anderson, Phoenixville, PA (US); Rashidus S. Mia, Phoenixville, PA (US); Matthew L. Ward, Collegeville, PA (US)

(73) Assignee: TruePosition, Inc., Berwyn, PA (US)

( * ) Notice: Subject to any disclaimer, the term of this patent is extended or adjusted under 35 U.S.C. 154(b) by 672 days.

This patent is subject to a terminal disclaimer.

(21) Appl. No.: 12/268,989

(22) Filed: Nov. 11, 2008

(65) Prior Publication Data

US 2010/0120447 A1 May 13, 2010

(51) Int. Cl.
- *H04W 24/00* (2009.01)
- *H04W 36/00* (2009.01)
- *H04W 40/00* (2009.01)
- *H04M 11/04* (2006.01)

(52) U.S. Cl. .......... 455/456.1; 455/404.2; 455/444; 455/449

(58) Field of Classification Search ....... 455/456.1–458, 455/404.2, 444, 449
See application file for complete search history.

(56) References Cited

U.S. PATENT DOCUMENTS

| | | | |
|---|---|---|---|
| 4,445,118 | A | 4/1984 | Sennott |
| 6,047,192 | A | 4/2000 | Maloney |
| 6,064,336 | A | 5/2000 | Krasner |
| 6,119,000 | A | 9/2000 | Stephenson |
| 6,782,264 | B2 | 8/2004 | Anderson |
| 2003/0064734 | A1* | 4/2003 | Stilp et al. .................. 455/456 |
| 2006/0003775 | A1 | 1/2006 | Bull |
| 2006/0030333 | A1 | 2/2006 | Ward |
| 2007/0097939 | A1* | 5/2007 | Nylander et al. ............ 370/338 |
| 2007/0155401 | A1 | 7/2007 | Ward |
| 2007/0254620 | A1 | 11/2007 | Lindqvist et al. |
| 2008/0076419 | A1 | 3/2008 | Khetawat |
| 2008/0085699 | A1* | 4/2008 | Hirano et al. ............. 455/414.2 |
| 2008/0132247 | A1 | 6/2008 | Anderson |

(Continued)

FOREIGN PATENT DOCUMENTS

WO  WO 2008047140 A1 *  4/2008

(Continued)

OTHER PUBLICATIONS

WO 2008/047140 A1 Controlling the use of Access points in a telecommunications network Law, Alan, Vodafone Group PLC.*

(Continued)

*Primary Examiner* — Dwayne Bost
*Assistant Examiner* — Michael Mapa
(74) *Attorney, Agent, or Firm* — Woodcock Washburn LLP

(57) ABSTRACT

Illustrative embodiments of the inventive subject matter described herein include, but are not limited to, the following: a femto-cell device, methods for use by a wireless location system (WLS) in locating a femto-cell device, and a wireless location system having certain features relating to the location of femto-cell devices. A femto-cell device used in a wireless communications system (WCS) includes a location subsystem configured to acquire information identifying the geographic location of the femto-cell device. The device also includes an antenna subsystem, a radio frequency (RF) block coupled to the antenna subsystem, a baseband block coupled to the RF block, and a communications block coupled to the baseband block. In addition, the device is configured to communicate with the WCS, including communicating at least some of the location information to the WCS.

23 Claims, 17 Drawing Sheets

U.S. PATENT DOCUMENTS

| | | | | |
|---|---|---|---|---|
| 2008/0188243 | A1* | 8/2008 | Giustina et al. | 455/456.6 |
| 2008/0252518 | A1* | 10/2008 | Yeshayahu | 342/357.02 |
| 2008/0261611 | A1 | 10/2008 | Mia | |
| 2008/0261612 | A1 | 10/2008 | Mia | |
| 2008/0299992 | A1* | 12/2008 | Eitan et al. | 455/456.5 |
| 2009/0061924 | A1* | 3/2009 | Morrill et al. | 455/552.1 |
| 2010/0184421 | A1* | 7/2010 | Lindqvist et al. | 455/418 |

FOREIGN PATENT DOCUMENTS

| | | |
|---|---|---|
| WO | WO 2008/051929 | 5/2008 |

OTHER PUBLICATIONS

"Study Find Interference Between Femtocells and Maco Network Not a Problem," Cellular-News, http://www.cellular-news.com/story/34931.php, downloaded 2008, 4 pages.

"at&t unwraps 3g microcell with gps," Macintosh News Networks, Inc., © 1995-2005, 1 page.

Ray, B., "Americans get indoor iPhones: Femtocells supersize while picocells go femto," The Register, © 1999-2009, p. 1-2.

PCT Notification of Transmittal of the International Search Report and the Written Opinion of the International Searching Authority mailed Feb. 25, 2010, issued in corresponding International Application No. PCT/US2009/060687.

PCT Notification of Transmittal of the International Search Report and the Written Opinion of the International Searching Authority mailed Dec. 10, 2009, issued in corresponding International Application No. PCT/US2009/060698.

U.S. Appl. No. 11/948,244, filed Nov. 30, 2007, Anderson.

U.S. Appl. No. 12/192,842, filed Aug. 15, 2008, LeFever.

Rubin et al., "Femtocells Bringing Reliable Location and Timing Indoors," InsideGNSS, www.insidegnss.com, Fall 2008, 40-46.

"Femtocells Designs "sniff" out Cells: Enables Self-Wireless Organizing Wireless Networks," Cellular-News, Nov. 7, 2008, 2 pages.

McKee, Charles W., "SPRINT Airwave Femto-cell contains GPS and will not operate without a GPS fix," letter to the FCC dated Aug. 21, 2008, 2 pages.

Flanagan, Michael J., comment, "Could Femto-cells Bring More Problems Than They Solve?" Cellular-news, www.cellular-news.com, Aug. 7, 2008, 2 pages.

Dano, M., "Report: AT&T Mobility to sell $100 femtocells," RCR Wireless: Intelligence on All Things Wireless, Apr. 24, 2008, 2 pages.

Rao, Srinivasa et al., "Femtocell Network Architecture and Signaling Protocol Options," White Paper, Continuous Computing, www.ccpu.com, Mar. 2008, 1-9.

Ho et al., "Effects of User-Deployed, Co-Channel Femtocells on the Call Drop Probability in a Residential Scenario," The 18$^{th}$ Annual IEEE International Symposium on Personal, Indoor and Mobile Radio Communications (PIMRC'07), 2007, 5 pages.

"System Requirements for Femto Cells Systems," 3GPP2 S.P0126-0, 2008, 17 pages.

"Universal Geographical Area Description (GAD)," 3GPP TS 23.032 V7.0.0, published Jun. 2006, 30 pages.

TR-069, "CPE WAN Mangement Protocol 1.1." DSL Forum, May 2004, 109 pages.

* cited by examiner

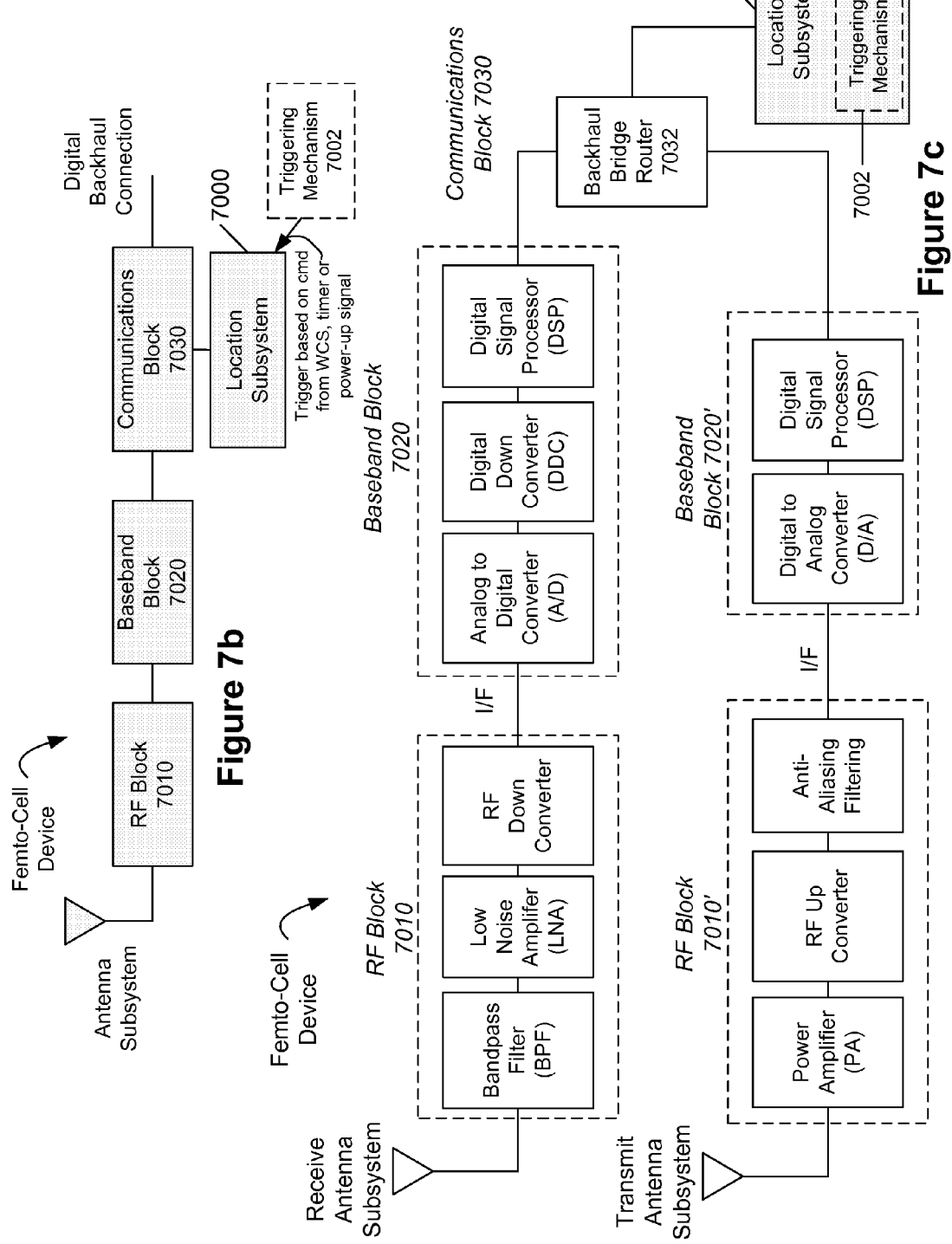

FEMTO-CELL LOCATION BY DIRECT METHODS

CROSS REFERENCE

The subject matter described in this application is related to the subject matter of U.S. application Ser. No. 12/269,000, filed on Nov. 11, 2008, currently pending, entitled "Femto-Cell Location By Proxy Methods," which is hereby incorporated by reference in its entirety.

TECHNICAL FIELD

The subject matter described herein relates generally to methods and apparatus for locating wireless base stations via attached or proximate mobile devices, acquisition of on-air or on-line base station data, and using a discovered location and acquired radio and system data for RF planning (including provisioning of a calculated default emergency services location). In addition, the subject matter described herein relates to the use of wireless location technology to lower the cost and increase the interoperability of low-power base stations or access points.

BACKGROUND

Background information relating to the inventive technologies described herein will be summarized in this section. In addition, the following references provide further background information for the interested reader:

3GPP2 S.P 0126-0 System Requirements for femto Cell Systems;

"Universal Geographical Area Description (GAD)" Document ID: 3GPP TS 23.032 V7.0.0 (published 2006-06);

U.S. patent application Ser. No. 11/607,420, filed Dec. 1, 2006, entitled "System for Automatically Determining Cell Transmitter Parameters to Facilitate the Location of Wireless Devices" (published as U.S. 20080132247A1);

U.S. patent application Ser. No. 11/948,244, filed Nov. 30, 2007 "Automated Configuration of a Wireless Location System"; and TR-069, "CPE WAN Management Protocol 1.1" DSL Forum.

Since the advent of cellular telecommunications in 1984, and especially in the past decade, the cellular industry has increased the number of air interface protocols available for use by wireless telephones, increased the number of frequency bands in which wireless or mobile telephones may operate, and expanded the number of terms that refer or relate to mobile telephones to include "personal communications services," "wireless," and others. The air interface protocols now used in the wireless industry include AMPS, N-AMPS, TDMA, CDMA, GSM, TACS, ESMR, GPRS, EDGE, UMTS WCDMA, and others.

The term CDMA will be used to refer to the CDMA digital cellular (TIA/EIA TR-45.4 defined IS-95, IS-95A), Personal Communications Services (J-STD-008), and 3GPP2 defined CDMA-2000 and UMB standards and air interfaces. The term UMTS will be used to refer to the 3GPP specified Wideband-CDMA (W-CDMA) based Universal Mobile Telecommunications System, defining standards, and radio air interface. The term WiMAX is used to denote the IEEE defined 802.16, "Broadband Wireless"; 802.20, "Mobile Broadband Wireless Access"; and 802.22, "Wireless Regional Area Networks" technologies. The present invention also applies to the in-progress 3GPP defined Long-Term-Evolution (LTE) and the 3GPP LTE Advanced system among others.

Wireless base stations, also sometimes called Access Points, are the radio connection point for analog or digital cellular frequency reuse systems such as personal communications systems (PCS), enhanced specialized mobile radios (ESMRs), wide-area-networks (WANs), and other types of wireless communications systems. The other end of the radio communications link will be referred to as the mobile or mobile device, which may be a mobile, portable or fixed device.

As the number of wireless communications protocols have grown, so has the number of types of base stations (sometimes called base transceiver stations, or BTS). Originally, cells (now called macro-cells) were deployed according to a detailed geographic, topographic and radio frequency propagation models to provide maximum coverage areas. Macro-cell base stations have typical power output ranges from the 10's to 100's of Watts. As the usage increased, channels were added to the existing base stations and new base stations were added. To limit interference between base stations, antenna down-tilt and transmit power levels were adjusted and radio frequency propagation modeling was used to increase the frequency reuse ratio from 12 to 7, 4, 3 and even 1 in some cases.

Smaller cells (micro-cells) with lower radio power outputs and smaller installation footprints were deployed to provide capacity where needed. In some markets, an overlay/underlay scheme of macro-cells and micro-cells were created to maximize capacity and geographic coverage. micro-cells provide radio coverage over short ranges, typically from 300 to 1000 meters, and have lower output radio power compared to macro-cells, usually a few Watts. These macro/micro cell network solutions also had the virtue of limiting inter-BTS handoffs for fast moving mobile devices. As coverage requirements became more rigorous, even smaller and lower power base stations (pico-cells) were deployed to cover dead zones and provide capacity in high-traffic areas. A pico-cell radio power output is nominally less than 1 Watt.

The latest base station species is the femto-cell. A femto-cell differs from previous base station species in that a femto-cell is a portable, consumer deployed unit typically using licensed spectrum. Unlike the traditional base station, backhaul to the wireless communications network is via a consumer provided packet data (IP) connection rather than the dedicated or leased line switched circuit backhaul used in first and second generation cellular systems. Designed for indoor coverage, femto-cell radio power output nominally ranges from 0.5 to 0.1 Watt. femto-cells are also known as "Home eNode B's" in the Third Generation Partnership Program's (3GPP) Long Term Evolution (LTE) or Evolved UTRAN (eUTRAN) program.

Using consumer installed femto-cells as a low cost approach to adding coverage and capacity to the wireless communications network raises some difficulties that embodiments of the present invention seek to address. The femto-cell base station can be a temporary, portable, and consumer controlled device but it uses spectrum licensed to the wireless communications provider (WCP); therefore, radio frequency use and power should be managed to both allow the femto-cell to function and to minimize interference with the wireless communications network, including other femto-cells. Proposed femto-cell management protocols, such as the DSL Forum's TR-069, "CPE WAN Management Protocol 1.1", serve to auto-discover, provision and manage femto-cells but do not supply the femto-cell location. Also, since mobile devices using the femto-cell base station capacity should be able to use emergency services, the location of the femto-cell, if not the mobile device itself, should be provided in accordance to the United States Federal Communications Commission (FCC) mandate. To limit interference, early femto-cells will be able to listen to the surrounding radio environment and configure themselves automatically to minimize interference with the macro wireless communications network and other nearby femto-cells. Although some operator deployments may also use a distinct spectral band for femto-cells and thus limit interference with the wide-area radio communications network, femto-cell location may still be required by the FCC E911 Phase 2 mandate.

In one already described scenario, using the downlink receiver subsystem (as described in U.S. patent application Ser. No. 11/736,868, "Sparsed U-TDOA Wireless Location Networks," and expanded in U.S. patent application Ser. No. 11/948,244, "Automated Configuration of a Wireless Location System") of a network-based UTDOA wireless location system, location of stationary and mobile cells (including macro, micro, Pico, and femto-cells) can be acquired via detection and processing of the broadcast beacon(s). The broadcast beacon commonly implemented as a channel, or set of channels, in wireless radio access networks (GSM: BCCH, UMTS: BCH [PCCPCH], and CDMA: Broadcast Control Channel and pilot channel) allows mobile phones to discover geographically local base stations.

Overlay Network-based location solutions use specialized receivers and/or passive monitors within, or overlaid on, the wireless communications network to collect uplink (mobile device-to-base station) signals, which are used to determine location and velocity of the mobile device. Overlay Network-based techniques include uplink Time-Difference-of-Arrival (TDOA), Angle-Of-Arrival (AOA), Multipath Analysis (RF fingerprinting), and signal strength measurement (SSM).

Mobile-device based location solutions use specialized electronics and/or software within the mobile device to collect signaling. Location determination can take place in the device or information can be transmitted to a landside server which determines the location. Device-based location techniques include CID (serving Cell-ID), CID-RTF (serving cell-ID plus radio time-of-flight time-based ranging), CIDTA (serving cell-ID plus time-based ranging), Enhanced Cell-ID (ECID, a serving cell, time-based ranging and power difference of arrival hybrid), Advanced-Forward-Link-Trilateration (AFLT), Enhanced Observed Time Difference (E-OTD), Observed-Time-Difference-of-Arrival (OTDOA) and Global Navigation Satellite System (GNSS) positioning. An example of a GNSS system is the United States NavStar Global Positioning System. Hybrids of the network-based and mobile device-based techniques can be used to generate improved quality of services including improved speed, accuracy, yield, and uniformity of location. A wireless location system determines geographic position and, in some cases, the speed and direction of travel of wireless devices. Wireless location systems use uplink (device-to-network) signals, downlink (network-to-device) signals, or non-communications network signals (fixed beacons, terrestrial broadcasts, and/or satellite broadcasts). Network-based location solutions use specialized receivers and/or passive monitors within, or overlaid on, the wireless communications network to collect signaling used to determine location. Network-based techniques include uplink Time-Difference-of-Arrival (TDOA), Angle-Of-Arrival (AOA), Multipath Analysis (RF fingerprinting), and signal strength measurement (SSM). Hybrids of the network-based techniques can be used to generate improved quality of services including speed, accuracy, yield, and uniformity of location.

SUMMARY

Illustrative embodiments of the inventive subject matter described herein include, but are not limited to, the following: a femto-cell device, methods for use by a wireless location system (WLS) in locating a femto-cell device, and a wireless location system having certain features relating to the location of femto-cell devices.

For example, an illustrative embodiment of an inventive femto-cell device for use in a wireless communications system (WCS) includes a location subsystem configured to acquire information identifying the geographic location of the femto-cell device. In addition, the inventive device includes an antenna subsystem, a radio frequency (RF) block, a baseband block, a communications block, and a communications subsystem configured to communicate with the WCS (including communicating location information to the WCS).

Additional aspects of an illustrative embodiment of the inventive femto-cell device may include a triggering mechanism configured to actuate the location subsystem so as to cause the location subsystem to determine the geographic location of the femto-cell device. The triggering mechanism may be configured to actuate the location subsystem in response to the femto-cell device being turned on, periodically in response to a timer, and/or in response to a command from the WCS.

Other aspects of illustrative embodiments concern the location subsystem. As explained herein, the location subsystem may include a downlink receiver and be configured to acquire location information using downlink beacons from WCS base stations. Alternatively, the location subsystem may include a GPS receiver and be configured to acquire location information using GPS signals. (The GPS embodiments may further employ assistance information for use in acquiring the GPS signals.) The location subsystem may also include a high definition television (HDTV) receiver and be configured to acquire location information using HDTV beacons. Alternatively, the location subsystem may further include an HDTV receiver and be configured to acquire location information using a hybrid of downlink WCS beacons and HDTV beacons. The location subsystem may also be configured to acquire location information from a mobile station (MS) being served by the femto-cell device and to use the location information to calculate the location of the femto-cell device.

The communications subsystem may be configured to communicate location information via a digital backhaul data link to the WCS, a downlink beacon signal, an uplink traffic channel signal, and/or an uplink access channel signal.

As described below, a method for use by a WLS in locating a femto-cell device includes discovering and initiating location of the femto-cell device, and determining the location of the femto-cell device. The step of initiating location of the femto-cell device may include receiving a command from the WCS, receiving a wireless intelligent network trigger based on cell-ID information broadcast by the femto-cell device, or detection of a new cell-ID (e.g., by a radio network monitor or link monitoring system associated with the WLS).

In an alternative implementation of an inventive method for use by a WLS in locating a femto-cell device, the WLS includes a serving mobile location center (SMLC), a plurality of location measuring units (LMUs) in communication with the SMLC, a plurality of link monitors in communication with the SMLC, and an SMLC database in communication with the SMLC and containing cell locations and other radio aspects of the wireless communications system. In this implementation, the method includes the step of discovering and initiating location of the femto-cell device, wherein the discovering and initiating comprises at least one of the following procedures: receiving femto-cell ID information from the wireless communications system, discovery of the femto-cell ID information via analysis of call detail records, and discovery of the femto-cell ID information via monitoring of wireless communications system link traffic for new cell-IDs within messages related to call events. In addition, the method may include storing femto-cell identification information in the SMLC database, and setting a trigger for location of the femto-cell, wherein setting a trigger comprises at least one of the following procedures: setting a femto-cell cell-ID trigger in the SMLC database via a wireless intelligent network (WIN) facility, setting an internal femto-cell cell-ID trigger in the SMLC database to indicate to the WLS that MS location information should be examined to identify when the femto-cell device is serving the MS, setting a femto-cell cell-ID trigger in a radio network monitor (RNM) or link monitoring system (LMS) associated with the WLS, wherein the WLS is configured such that detection of the femto-cell cell-ID provokes the WLS to attempt location of the femto-cell device. The method may further include determining the location of the femto-cell device and providing location information to the SMLC database, calculating a confidence factor relating to the calculated location of the femto-cell device, and comparing the calculated confidence factor with a confidence factor stored in the SMLC database.

Finally, an inventive WLS in accordance with the disclosed embodiments includes a serving mobile location center (SMLC), a plurality of location measuring units (LMUs) in communication with the SMLC, a plurality of link monitors in communication with the SMLC, an SMLC database in communication with the SMLC and containing cell locations and other radio aspects of the wireless communications system, and a subsystem configured for locating a femto-cell device operating in the wireless communications system, including a subsystem configured for discovering and initiating location of the femto-cell device, and a subsystem configured for determining the location of the femto-cell device.

Other inventive aspects are disclosed below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings:

FIGS. 7b and 7c schematically depict embodiments of a femto-cell device.

DETAILED DESCRIPTION OF ILLUSTRATIVE EMBODIMENTS

We will now describe illustrative embodiments of the present invention. First, we provide a detailed overview and then a more detailed description of our inventive solutions.

Overview

Figure 1:
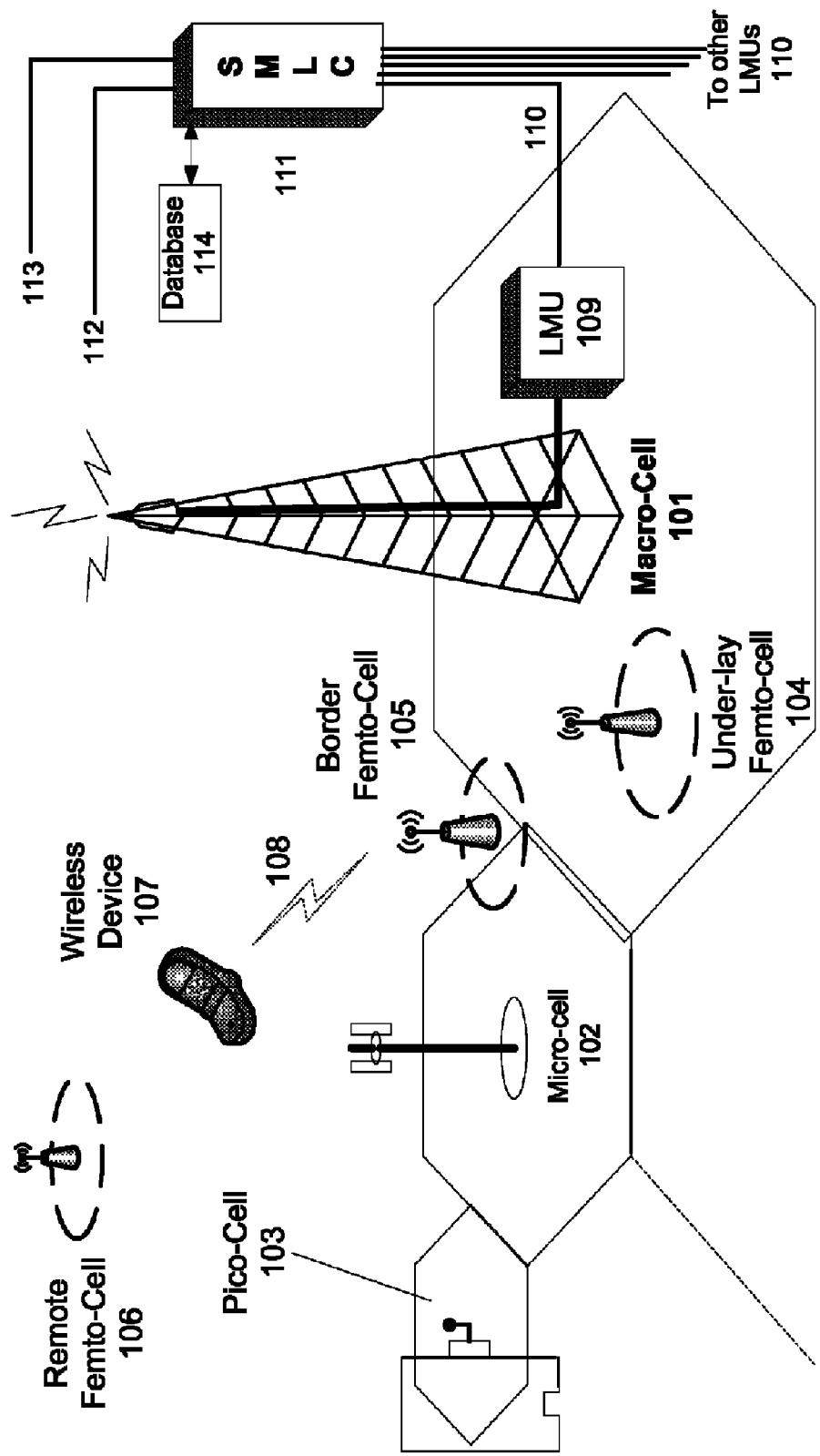
FIG. 1 schematically depicts a illustrative deployment of femto-cells in a wide area communications system with an associated overlaid wireless location system.

Femto-cells in a wide area wireless communications system are shown in FIG. 1. The wide-area or macro-cellular network includes geographically distributed cells (which may be a mix of macro-cells 101, micro-cells 102, and pico-cells 103, repeaters (not shown) and distributed antenna systems (not shown)). An under-lay femto-cell 104 may exist in the radio footprint of another cell providing additional traffic capacity. A border femto-cell 105 may under-lay multiple cell radio footprints and a remote femto-cell 106 may exist outside of the coverage (in dead areas) of the wide-area wireless network, providing increased coverage. When using femto-cells within a wide-area wireless communications network, the same mobile device 107 can communicate via radio signaling 108 with any of the macro-cell 101, micro-cell 102, pico-cell 103, and femto-cell 104 105 106 radio base stations. The wireless communications system may be deployed with a wireless location system, or WLS. For mobile-based location techniques, the mobile device 107 and serving mobile location center (SMLC) 111 are used to determine a location. For overlay network-based location techniques, location measuring units (LMUs) 109 may be deployed either standalone or co-located with base stations to achieve a geographic distribution. The LMUs 109 communicate with the SMLC 111 via packet data connections 110. The SMLC 111 communicates with one or more wireless communications networks via packet data connections 112. The SMLC 111 may also receive information to generate location via packet data connections 113 from link monitors deployed within the wireless communications system internal network. The SMLC contains a database 114 detailing the cell locations and other radio aspects of the wireless communications network.

Triggering a Direct Location

Network-based location solutions use specialized receivers and/or passive monitors within, or overlaid on, the wireless communications network to collect signaling used to determine location. Network-based techniques include uplink time-difference-of-arrival (TDOA), angle-of-arrival (AOA), multipath analysis (RF fingerprinting), and signal strength measurement (SSM). Hybrids of the network-based techniques can be used to generate improved quality of services including speed, accuracy, yield, and uniformity of location. Triggering of femto-cell location can be WLS autonomous, where the WLS itself detects and locates the femto-cell; commanded, where the wireless operator systems request that the WLS locate a known cell; or femto-cell autonomous, where the femto-cell uses on-board systems to self-locate. Another method is to use mobile devices as probe systems by analyzing the MAHO list for unknown neighbors for femto-cell beacons to trigger the location event.

Location Methodologies

The location methodology employed by the wireless location system may be dependent on the service area deployed or capabilities of the type or model of the femto-cell deployed. Addition of a mobile device receiver or transceiver allows for both Network-based and Mobile-device based techniques to function. Since the femto-cell location is expected to be indoors in most scenarios, a mix of network-based and mobile device-based techniques can be used opportunistically and the femto-cell location developed and refined over time.

Network-based wireless location systems can collect radio energy and signaling from either or both the reverse control and traffic channels (mobile to base station), the forward (broadcast) channel (broadcast by the femto-cell) and/or the forward traffic channel (cell-to-mobile device). Location can be accomplished for any of those channels using POA (power of arrival for ranging), PDoA (power difference of arrival), ToA (time of arrival), TDoA (time difference of arrival), or AoA (angle of arrival), or combinations of these techniques. Femto-cell based wireless location systems may include those using POA, PDOA, TOA, TDOA, GPS, or A-GPS. Hybrids, combining multiple network-based techniques, multiple device-based techniques, or a combination of network and device based techniques, can be used to achieve the accuracy, yield, and latency requirements for the location-based application.

Mobile device, in this case the femto-cell itself, based location solutions use specialized electronics and/or software within the mobile device to collect signaling. Location determination can take place in the device or information can be transmitted to a landside server which determines the location. Device-based location techniques include CID (serving cell-ID), CIDTA (serving cell-ID plus time-based ranging), Enhanced Cell-ID (ECID, a serving cell, time-based ranging and power difference of arrival hybrid), AFLT (Advanced-Forward-Link-Trilateration), E-OTD (Enhanced Observed Time Difference) and OTDOA (Observed-Time-Difference-of-Arrival). Hybrids of the device-based techniques can be used to generate improved quality of services including speed, accuracy, yield, and uniformity of location. Such hybrids may include both network-based and device-based techniques.

Direct Femto-Cell Location Via Uplink Beacon TDOA or TDOA/AoA

In one already described scenario, using the downlink receiver subsystem (as defined in U.S. patent application Ser. No. 11/736,902, filed on Apr. 18, 2007, entitled "Sparsed U-TDOA Wireless Location Networks" and expanded in U.S. patent application Ser. No. 11/948,244, filed on Nov. 30, 2007, entitled "Automated Configuration of a Wireless Location System") of a network-based UTDOA wireless location system, location of stationary and mobile femto-cells can be acquired via detection and processing of the broadcast beacon(s). The broadcast beacon commonly implemented as a channel, or set of channels, in wireless radio access networks (GSM: BCCH, UMTS: BCH [PCCPCH], and CDMA: Broadcast Control Channel and pilot channel) allow mobile phones to discover geographically local base stations. Since the femto-cell beacon is broadcast at a much lower power than traditional base stations and are expected to be severely attenuated by the surrounding structure, modifications to the downlink receiver subsystem will be desired, with long sampling periods and high dynamic range receivers being employed to detect and demodulate the femto-cell beacon. Since the SMLC database can contain the exact identifiers broadcast in the femto-cell beacon, the femto-cell beacon transmission can be completely modeled for any interval allowing for advanced digital signal processing over the entire collection duration. This long sample collection duration assists in TDOA, AoA and hybrid TDOA/AoA location techniques.

Theoretically, the accuracy of the TDOA estimation is limited by several practical factors such as integration time, signal-to-noise ratio (SNR) at each receiver site, as well as the bandwidth of the transmitted signal. The Cramer-Rao lower bound (CRLB) illustrates this dependence. It can be approximated as:

$$TDOA_{rms} = \frac{1}{2\pi f_{rms} \sqrt{2SbT}}$$

Where $f_{rms}$ is the rms bandwidth of the signal, b is the noise equivalent bandwidth of the receiver, T is the integration time and S is the smaller SNR of the two sites. The TDOA equation represents a lower bound. In practice, the system should deal with interference and multipath, both of which tend to limit the effective SNR. Super-resolution techniques have been used to mitigate the deleterious effects of interference and multipath.

The CRLB can also be determined for Angle-of-Arrival (AoA) location techniques. Theoretically, it is expressed as:

$$AoA_{CRLB} = \frac{6}{m^3(T)SNR}$$

where m is a quantity proportional to the size of the AoA array in wavelengths, T is the integration time and SNR is the signal-to-noise ratio.

To enable the long integration times required for a TDOA and/or AoA location with such weak signals, digital signal processing techniques (such as those described in U.S. patent application Ser. No. 12/192,842, filed on Aug. 15, 2008, entitled "Variable Coherence for the Location of Weak Signals") can be used to compensate for the femto-cell beacon transmitter frequency drift while still affording the long sampling periods needed for TDOA location. The variable coherence method is also applicable for vehicle mounted or otherwise mobile femto-cell beacons where variable Doppler shifts in frequency occur.

Downlink Beacon TDOA/AOA

Figure 2A:
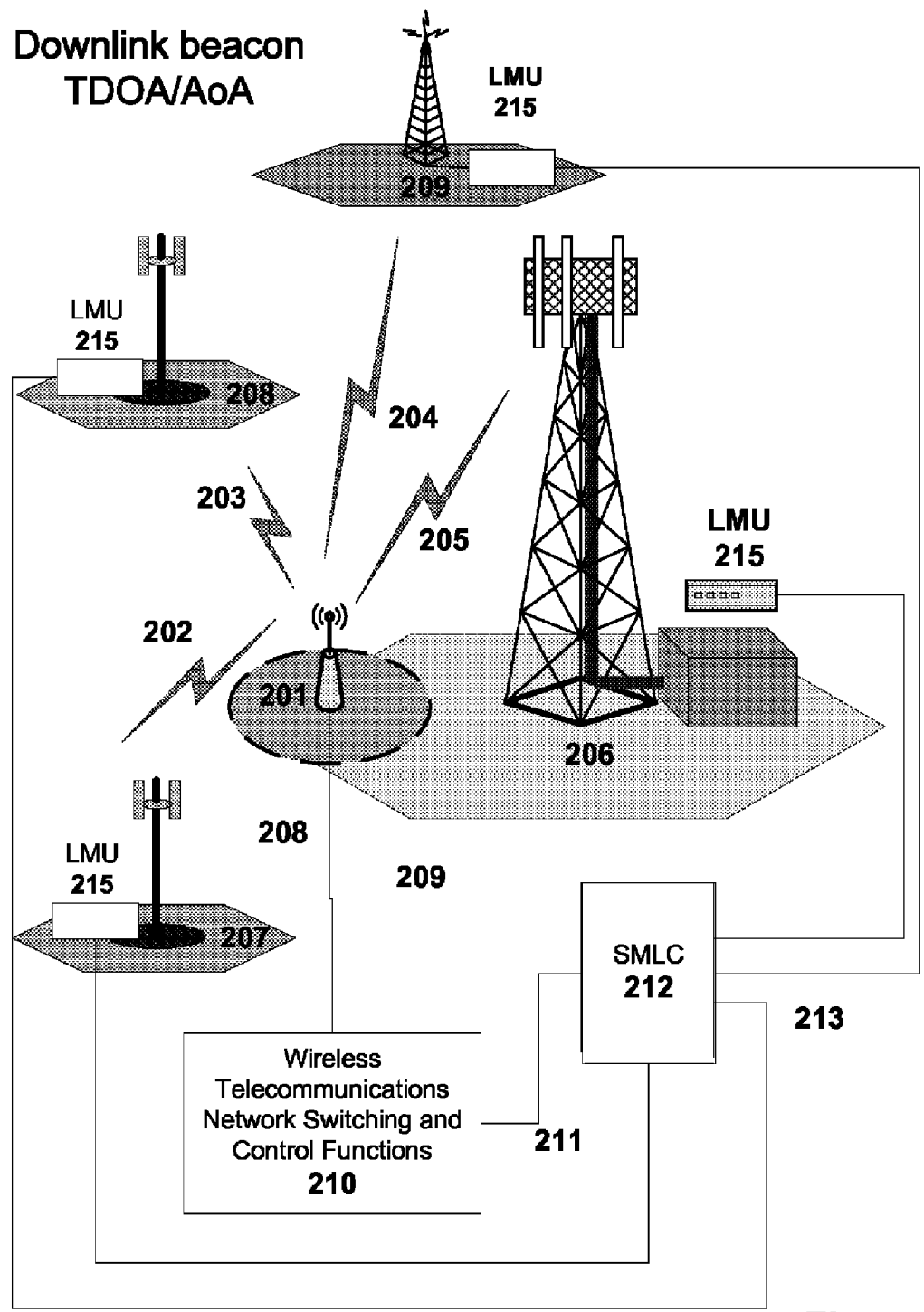
FIG. 2a illustrates a femto-cell location method employing downlink beacon TDOA/AOA location algorithms.

In the example wireless communications system (WCS) and wireless location system (WLS) shown in FIG. 2a, the un-modified femto-cell 201 broadcasts its beacon 202 203 204 205, which is received by downlink-receiver equipped LMUs 215. The LMU network 215 is in this example co-located with the WCS base stations 206 207 208 209, but standalone LMUs may be deployed for capacity or geographic coverage.

The femto-cell is attached to the Wireless Telecommunications Network switching and Control Functions 210 via digital data link 208. Via this link, the femto-cell broadcast message and power can be manipulated. The SMLC 212 communicates with the Wireless Telecommunications Network switching and Control Functions 210 over a digital data link 211 to receive the broadcast message parameters and format, to signal when a power-up of the beacon is required, and to receive and respond to emergency services or commercial position requests for mobiles using the femto-cell 210.

The LMU network 215 and the associated SMLC 212 are connected by digital data links 213 allowing upload (from the SMLC 215) of signal data and download (from the LMUs 215) of location data or signal data to be passed to other LMUs.

The WLS (the LMU network 215 and the SMLC 212) uses the known beacon messaging to construct an ideal reference which is passed to each LMU for matched-replica processing. Matched replica processing is described in U.S. Pat. No. 6,047,192, Apr. 4, 2000, "Robust, efficient, localization system". Additional signal processing techniques may be applied, depending on the beacon signal power, SNR, or quality. Preferably, the femto-cell location is stored by the SMLC and will be updated in accordance with the procedure described herein.

Mobile TDOA/AOA

Figure 2B:
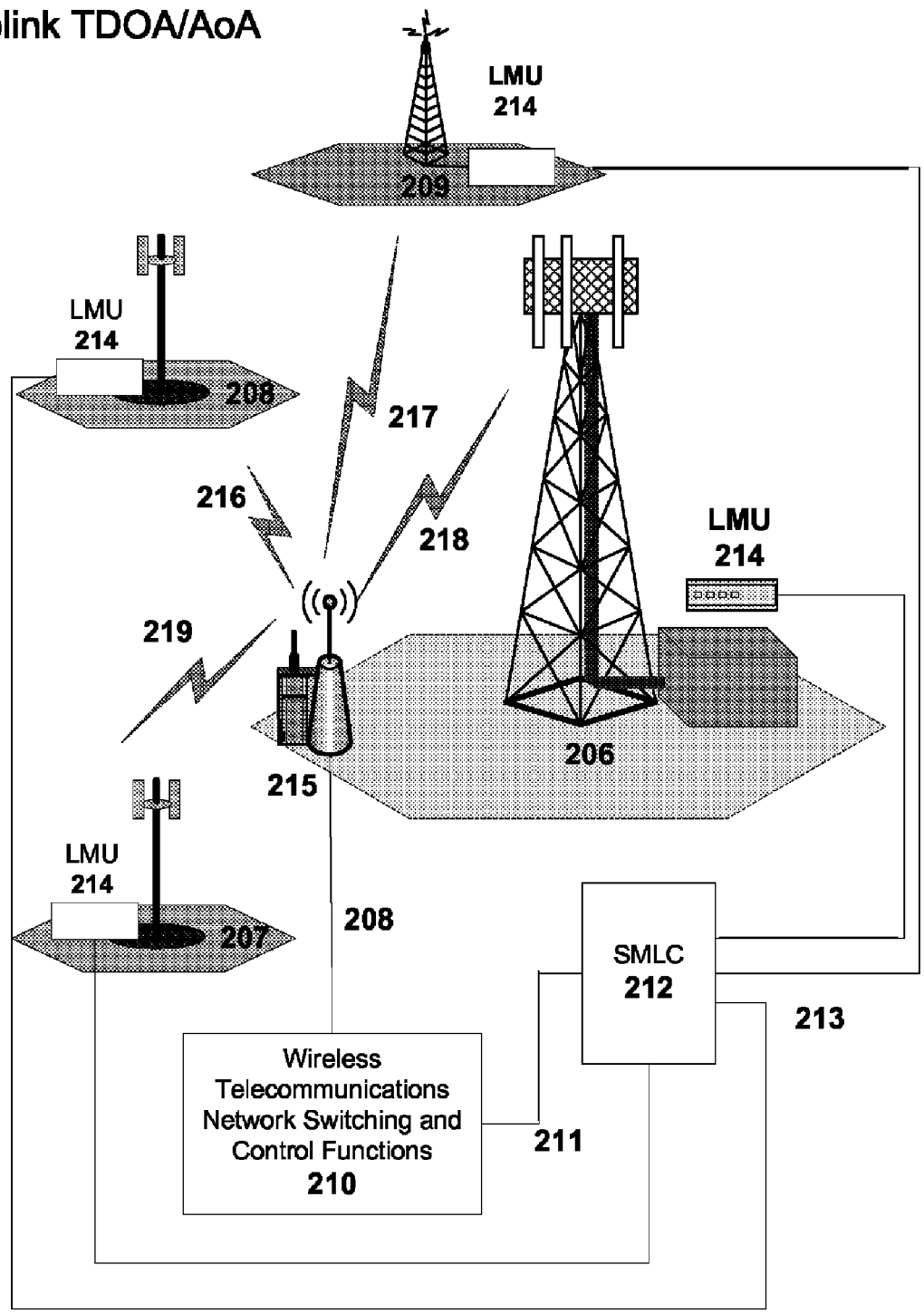
FIG. 2b illustrates a femto-cell location method employing uplink TDOA/AOA location algorithms.

In the example wireless communications system and wireless location network shown in FIG. 2b, the modified femto-cell 215 includes a full mobile transceiver. The LMU network 214 is in this example co-located with the WCS base stations 206 207 208 209, but standalone LMUs may be deployed for capacity or geographic coverage. The femto-cell device 215 is attached to the Wireless Telecommunications Network Switching and Control Functions 210 via digital data link 208. Via this link, the femto-cell included mobile transceiver behavior can be controlled and mobile power can be manipulated. The SMLC 212 communicates with the Wireless Telecommunications Network Switching and Control Functions 210 over a digital data link 211 to receive the femto-cell related identification, to signal when a power-up of the mobile transmission is required, to power the mobile circuitry on or off, and to receive and respond to emergency services or commercial position requests for mobiles using the femto-cell 210.

The LMU network 214 and the associated SMLC 212 are connected by digital data links 213 allowing upload (from the SMLC 212) of signal data and download (from the LMUs 214) of location data or signal data to be passed to other LMUs. The WLS (the LMU network and the SMLC 212) uses the mobile transceiver's radio transmissions to construct an ideal reference which is passed to each LMU for matched-replica processing.

Direct Femto-Cell Location Using On-Board Downlink Location Capabilities

As an alternative to the network-based beacon detection and location approach and as a lower-cost alternative to the addition of a GNSS receiver into the chassis of the femto-cell, the incorporation of a specialized downlink receiver into the femto-cell circuitry presents a location implementation with greater ability to function indoors due to greater downlink power signal levels. Modeled on the downlink receiver of a mobile telephone, the femto-cell downlink receiver (FDR) is used to scan the wireless network provider's spectrum and detect, demodulate and decode the beacons of wireless communication network broadcasts from cells in near geographic proximity. In this embodiment, the downlink receiver is enhanced with a software-defined radio, additional digital signal processing capabilities and greater memory capacity. The downlink receiver incorporated into the stationary femto-cell allows long integration times, which boosts its ability to detect and demodulate distant or highly attenuated beacons. Digital signal processing techniques can be used to amplify beacons, mitigate frequency drift during long signal collection times, and overcome attenuation from surrounding structures. Once beacon signaling can be collected at the femto-cell, conventional mobile-device based location techniques such as ECID, AFLT, EOTD, or OTDOA become possible. The location methodology may be dependent on the characteristics of the underlying radio communications network or radio location system used by the wireless communications network provider.

AFLT

Figure 3:
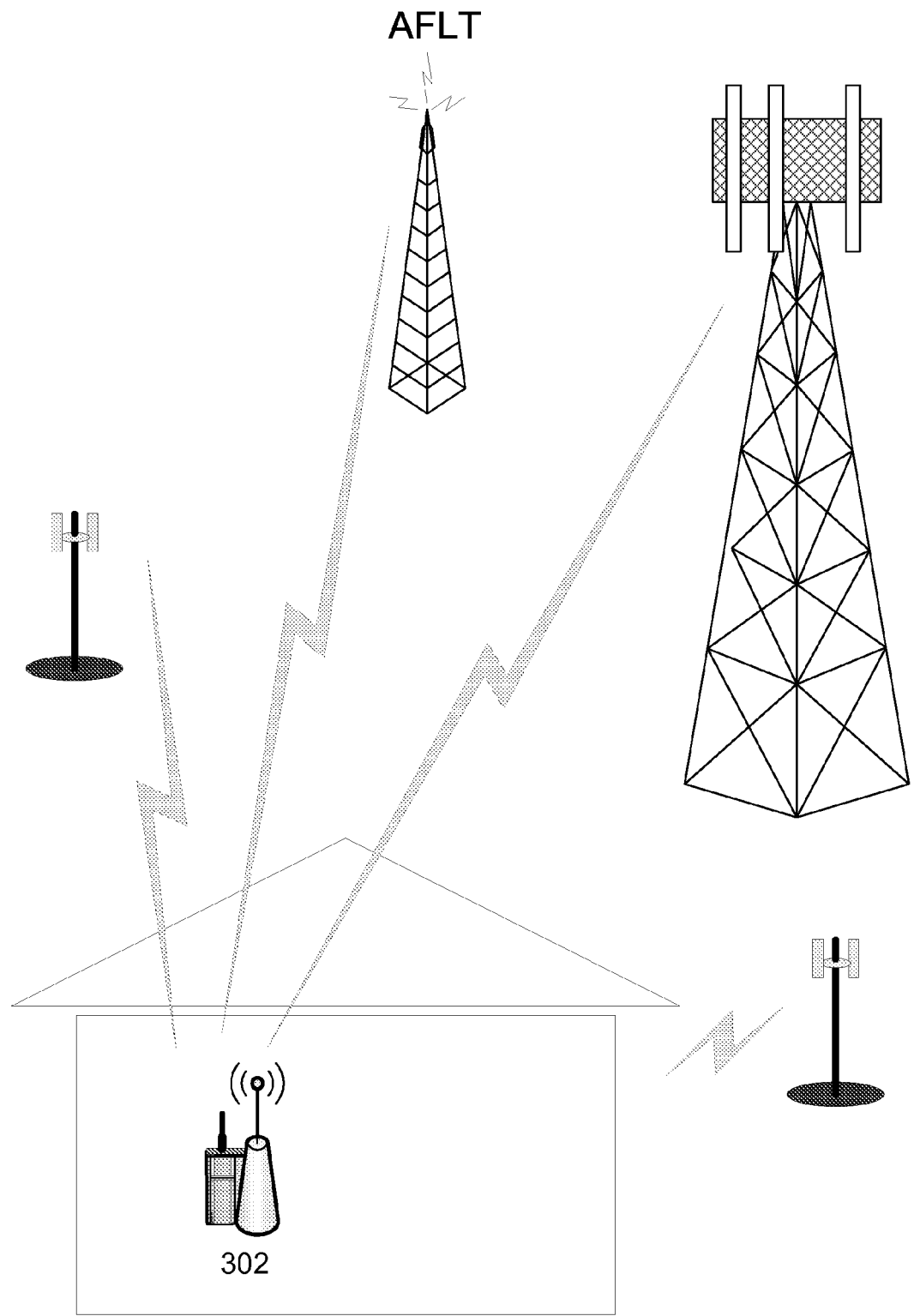
FIG. 3 illustrates a femto-cell location method employing Advanced Forward Link Trilateration (AFLT) location algorithms.

Advanced Forward Link Trilateration (AFLT) is a technique defined in the TIA IS-95 and CDMA 2000 standards in which a CDMA mobile device makes relative time difference measurements of the pilot signals transmitted by geographically distributed CDMA base stations, to compute a location using multi-lateration. The pilot signals may include those cells in soft-handoff with the mobile device (the active set), or cells included in the candidate set or in the neighbor set. Since IS-95 and IS-2000 CDMA systems are synchronous, real time knowledge of the beacon timing offsets is not necessary, but can improve accuracy. Databased or broadcast knowledge of the beacon location should also be available to compute a position. In the example wireless communications system and wireless location network shown in FIG. 3, the modified femto-cell 302 includes a mobile transceiver.

PDOA/ECID

In the course of operation, the mobile device (in this example a mobile device mimic included within the femto-cell) collects power information about beacons from nearby cells and sectors. This power information can be used with databased knowledge of the beacon antenna's location and transmit power level to perform a power-of-arrival (POA) location or a power-difference-of-arrival (PDOA) location. One common mobile location technique is called Enhanced Cell Identification (ECID). This technique may be used to locate mobile devices in which information including the serving cell location, time-based range from the serving cell, and multiple received power level measurements of the signals transmitted by nearby, geographically distributed base stations are used to compute the mobile device location.

Figure 4A:
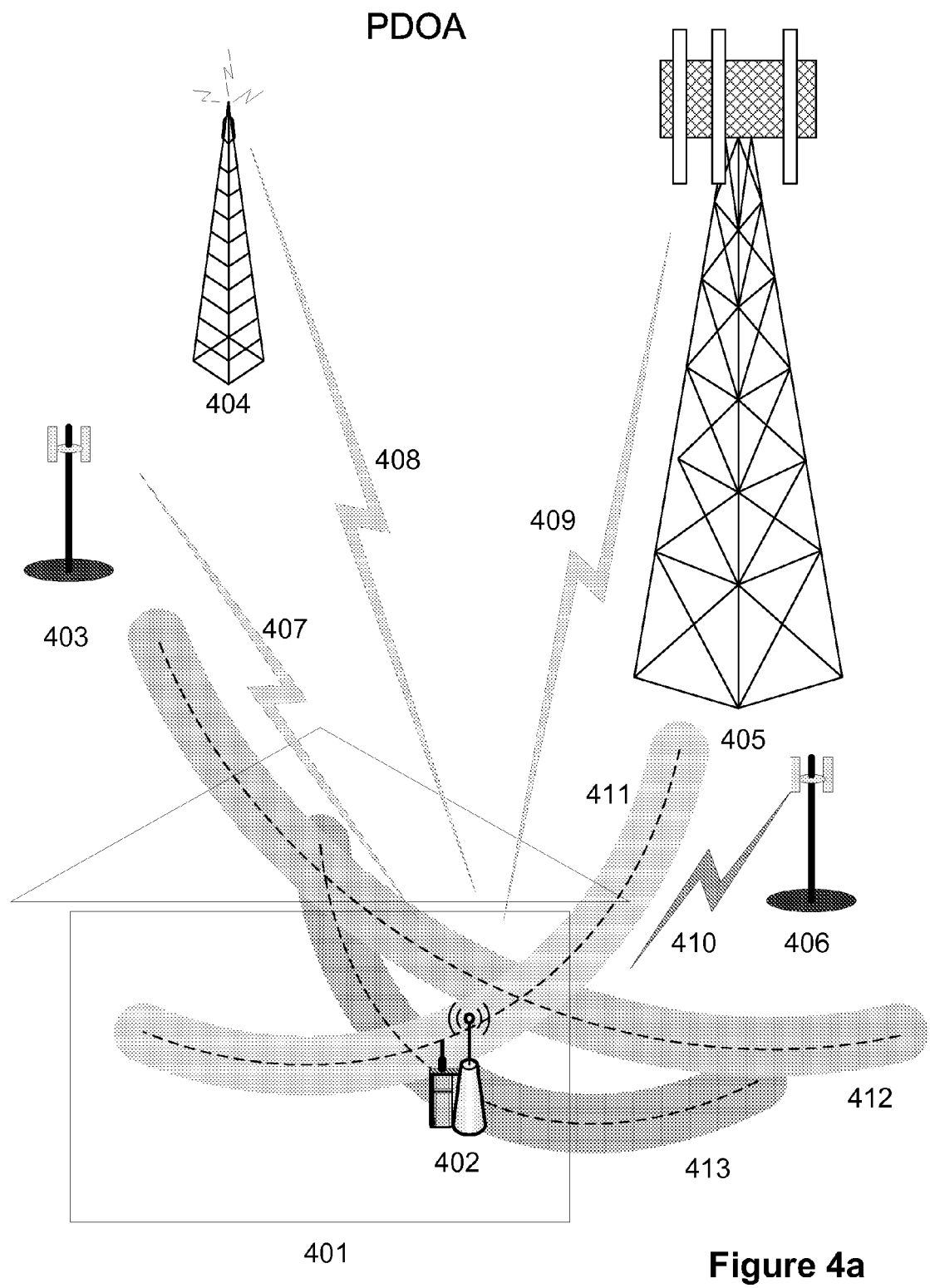
FIG. 4a illustrates a femto-cell location method employing a power-difference-of-arrival location algorithm.

FIG. 4a shows an example of the enhanced femto-cell 402 being located using a power-difference-of-arrival method. In this example, the enhanced femto-cell 402 is surrounded by a structure 401. The base stations 403 404 405 406 each transmit a beacon signal 407 408 409 410. The structure may block even these relatively high power radio signals (as shown with beacon 410 from base station 406). In this example, sufficient beacons (3 or more) are available to create a PDOA solution of three hyperbolas 411 412 413, which are sufficient to resolve a location for the enhanced femto-cell 402. The ECID technique could enhance the basic PDOA downlink beacon location, but requires that the mobile device subsystem of the enhanced femto-cell 402 be in communication with the wireless communications network while the PDOA technique may be purely passive.

EOTD

In GSM and UMTS systems, two mobile device based wireless location techniques have been defined that may also be used to locate the enhanced femto-cell 402. Defined for GSM mobile location, the Enhanced Observed Time Difference (EOTD) is a location technique defined in the ETSI 3GPP Technical Specification 43.059. In this technique, a GSM mobile station (MS) makes relative time difference measurements of beacon signals, such as those transmitted by geographically distributed base stations, where these measurements and real time knowledge of the beacon timing offsets and databased or broadcast knowledge of the beacon location are used to compute a position.

Figure 4B:
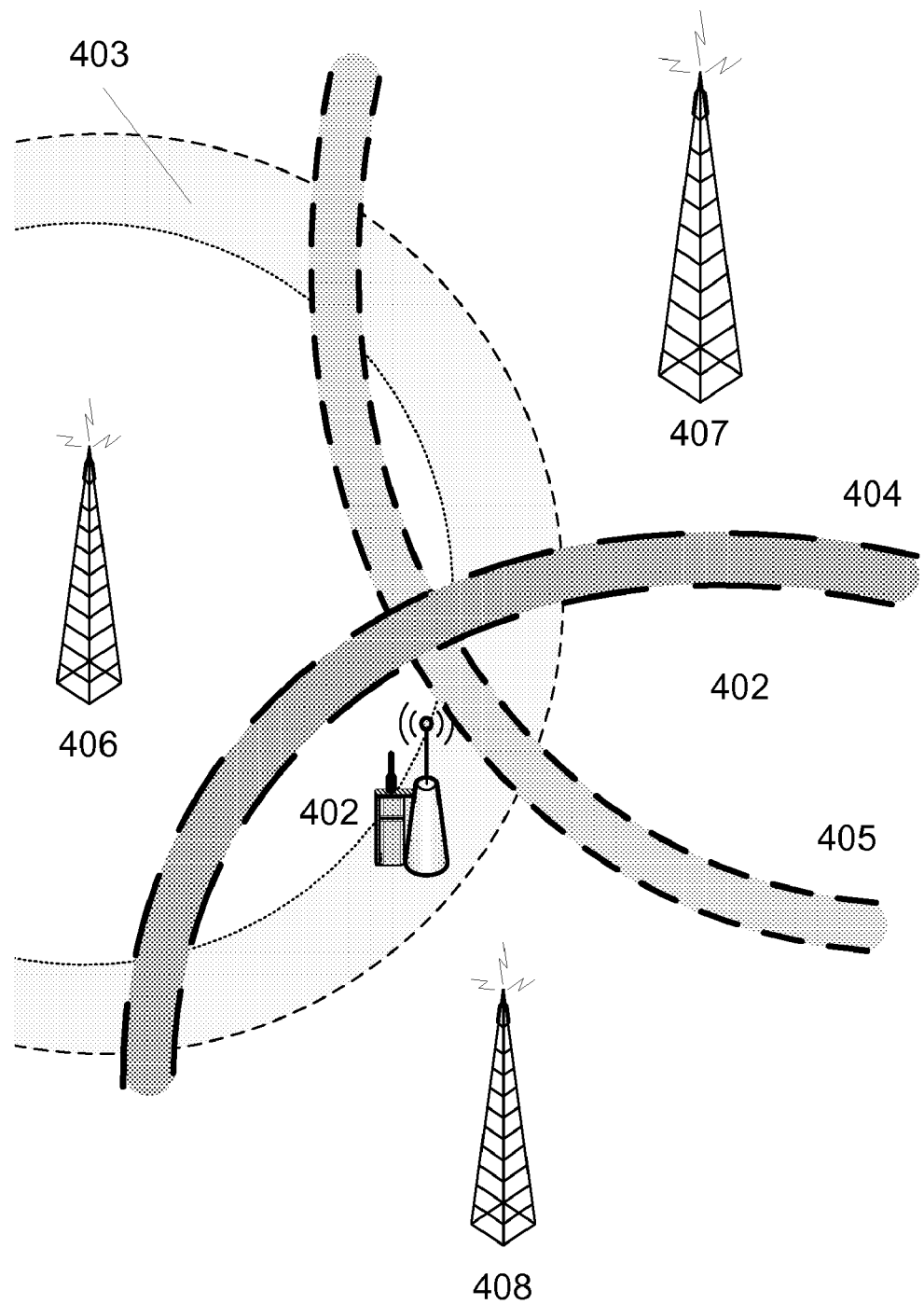
FIG. 4b illustrates a femto-cell location method employing an Enhanced Observed Time Difference (EOTD) location algorithm.

In FIG. 4b, the GSM MS is a subsystem of the enhanced femto-cell 402. The beacon signals from the geographically proximate GSM base stations 406 407 408 are collected by the MS and passed to the wireless location system (not shown) over a GSM radio datalink. The SMLC component of the WLS then processes the relative time difference measurements with the beacon timing offset information and beacon transmitter locations to compute a set of TDOA hyperbolas 403 404 405. With three or more geographically distinct beacons, the TDOA solution will come to a location estimate. However, since the MS is in active communications with the serving cell 406 of the GSM network (known by the Cell Global Identifier (CGI) and time-based range 403 (the GSM Timing Advance (TA)) from the serving cell), the CGI and TA information can be combined with the TDOA hyperbolas in the final location estimate.

OTDOA

Defined for UMTS mobile location, Observed Time Difference of Arrival (OTDOA) is a location technique defined in the ETSI 3GPP Technical Specification 23.271 in which the User Equipment (UE), which in this example is incorporated into the enhanced femto-cell 402, is essentially a mobile station in a UMTS network, makes relative time difference measurements of the signals transmitted by geographically distributed Node Bs (base stations in a UMTS system), where these measurements are used to compute a location and real time knowledge of the beacon timing offsets and databased or broadcast knowledge of the beacon location are used to compute a position.

Figure 4C:
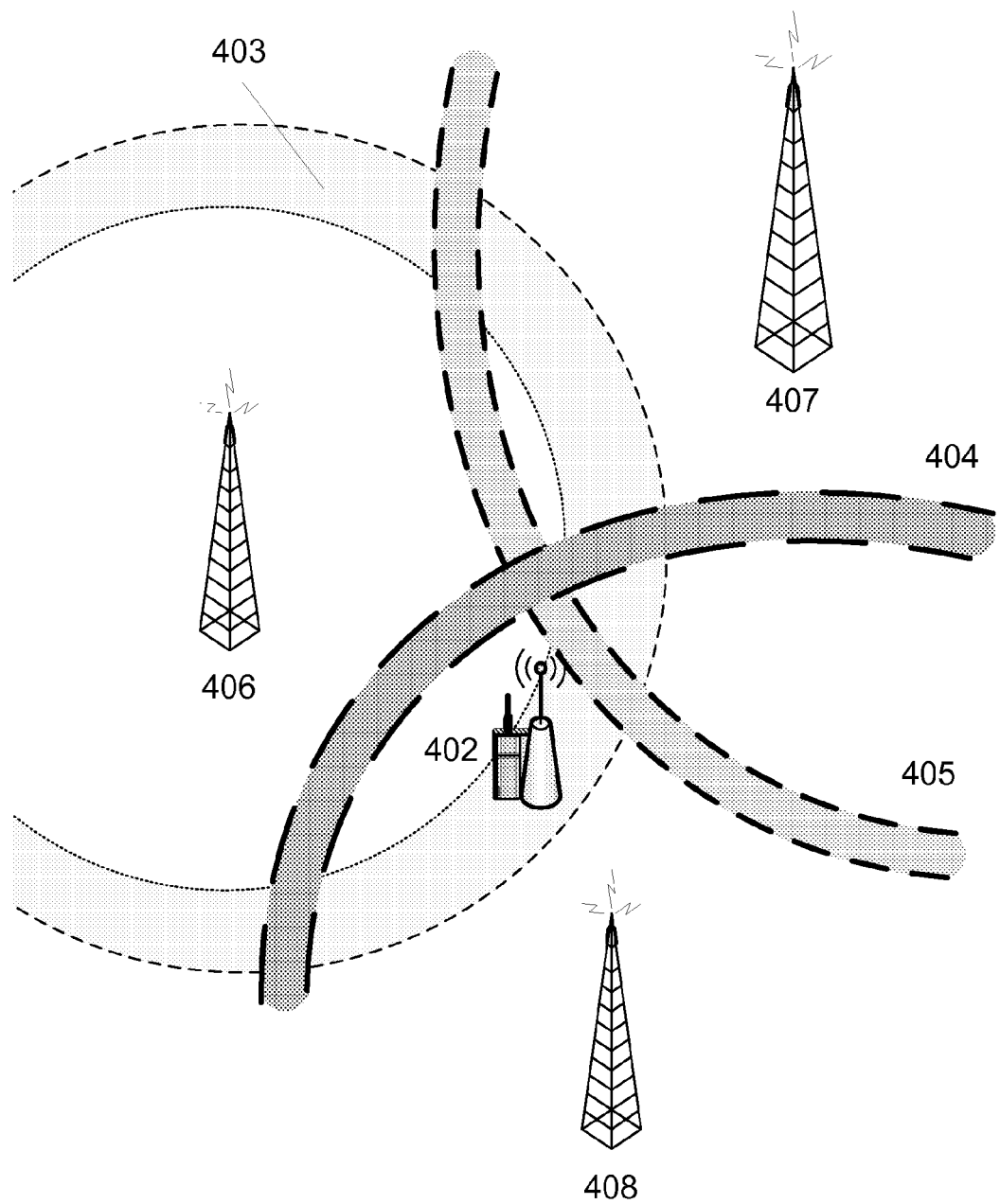
FIG. 4c illustrates a femto-cell location method employing an Observed Time Difference of Arrival (OTDOA) location algorithm.

In FIG. 4c, the UMTS UE is a subsystem of the enhanced femto-cell 402. The beacon signals from the geographically proximate UMTS NodeB base stations 406 407 408 are collected by the UE and passed to the Wireless Location System (WLS) (not shown) over a UMTS radio datalink. The SMLC component of the WLS then processes the relative time difference measurements with the beacon timing offset information and beacon transmitter locations to compute a set of TDOA hyperbolas 403 404 405. With three or more geographically distinct beacons, the TDOA solution will come to a location estimate. However, since the UE is in active communications with the serving cell 406 (known by the Cell Identifier (CI or CID) and time-based range 403 (using ½ the UMTS Round-trip-time (RTT) from the serving cell), this information can be combined with the TDOA hyperbolas in the final location estimate.

Note that the enhanced femto-cell may be deployed with a dual mode MS/UE subsystem allowing for both or either of EOTD or OTDOA positioning of the femto-cell upon the election of the SMLC using its knowledge of the local service area network topology, cell density, and air interface capabilities.

Direct Femto-Cell Location Using On-Board Downlink Beacon Location Capabilities

For those makes and models of femto-cells equipped with a Location Determination Subsystem (LDS), position calculation may be accomplished using broadcast beacon techniques. A broadcast beacon is any signal transmitted from a precisely known location with a known time and frequency stability. The precise location need not be a static location. Examples of broadcast beacons include television stations (HDTV), the United States LORAN system, and single purpose networks such as LoJack®. If the broadcast beacon contains details of the transmitter's precise location and broadcast power, the LDS may self locate using power-difference-of-arrival techniques. Alternately, the femto-cell may upload acquired signal ID and power data to a location server (for example, the SMLC) for location calculation.

The LDS of the femto-cell enables device-based, network-based and/or hybrid location technologies. This subsystem can collect power and timing measurements, cell-broadcast information and other collateral information for various location methodologies, including but not limited to: device-based time-of-arrival (TOA), forward link trilateration (FLT), Advanced-forward-link-trilateration (AFLT), Enhanced-forward-link-trilateration (E-FLT), Enhanced Observed Difference of Arrival (EOTD), Observed Time Difference of Arrival (O-TDOA), Global Positioning System (GPS) and Assisted GPS (A-GPS).

Direct Femto-Cell Location Using on-Board GNSS Location Capabilities

With certain models of femto-cells, a GPS receiver may be included in the circuitry of the femto-cell chassis. Although heavily occluded by the surrounding structure, the GPS receiver may be able, using long signal integration times, to detect, decode and self locate. The present inventive system, with its network-based location capabilities and network database allows the wireless communications network to provide assistance data germane to the rough location of the GNSS-equipped femto-cell. This method of providing assistance data to decrease the latency and improve the accuracy of a GPS location fix is an improvement on U.S. Pat. No. 4,445,118, "Navigation system and method" Taylor et al, and U.S. Pat. No. 6,064,336, "GPS receiver utilizing a communication link", Krasner et al. The rough location of the femto-cell may be produced using any of the network-based or device-based techniques described in this specification or in U.S. application Ser. No. 12/269,000, filed on even date herewith, entitled Femto-Cell Location by Proxy".

GPS

Figure 5:
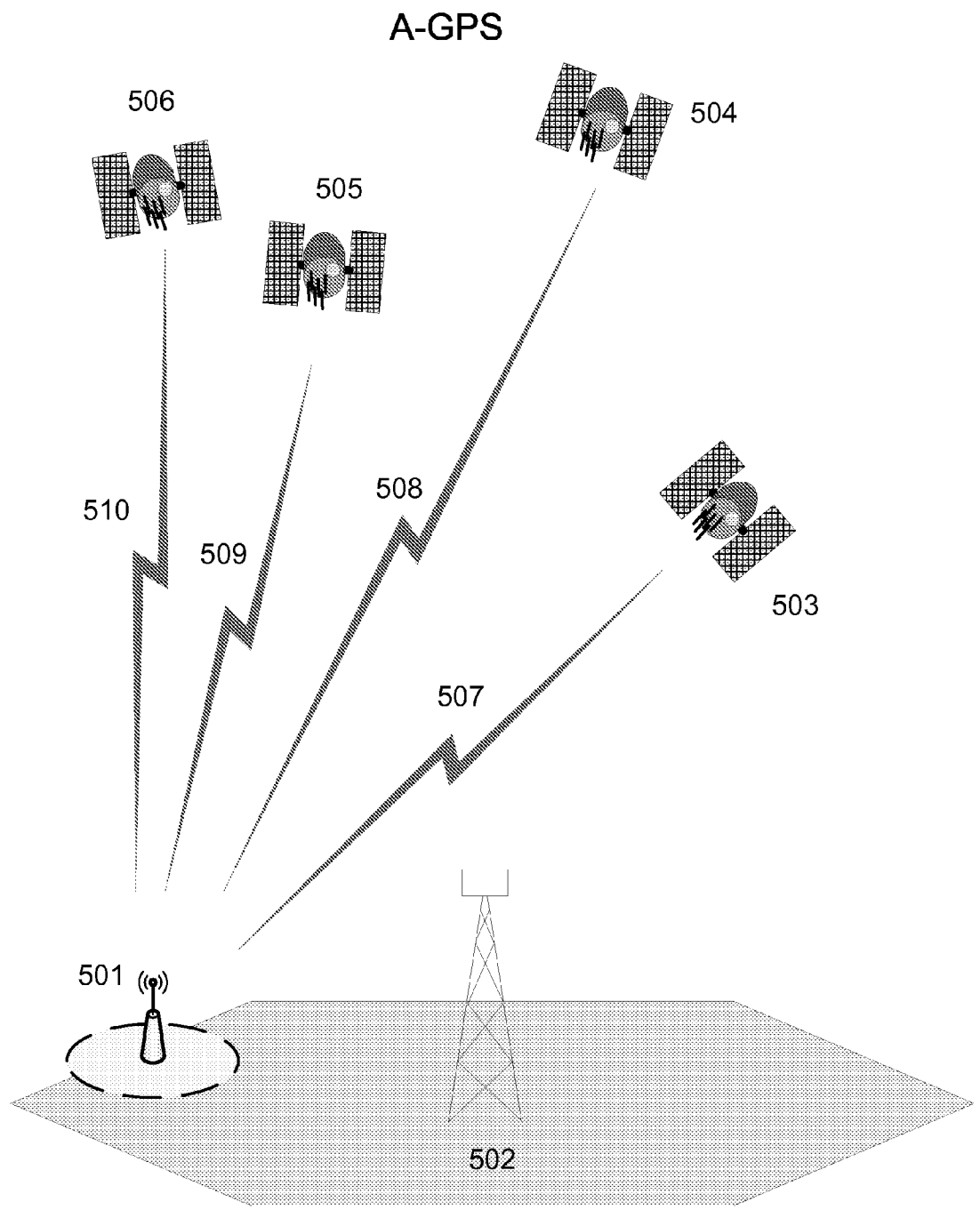
FIG. 5 illustrates an illustrative GPS embodiment in which a femto-cell equipped with GNSS capability is deployed within a wide area cellular network.

In the FIG. 5 example, a femto-cell equipped with GNSS capability 501 (such as a GPS satellite receiver) is deployed within a wide area cellular network here represented by the cell 502. The GNSS constellation 503, 504, 505, 506, each broadcasts its time (derived from the onboard atomic clock), almanac and ephemerides information, which are used to compute a three dimensional position (latitude, longitude, altitude) according to the WGS-84 geodetic model. Assistance data can be provided to the GNSS enhanced femto-cell 501 via the wired connection to the telecommunications network or via broadcast by the wide-area network 502. This assistance data provides increased receiver sensitivity to the femto-cell based GNSS receiver, mitigating some of the expected attenuation caused by the surrounding structure(s).

The GNSS location information (pseudo-ranges or latitude/longitude/altitude estimates) may be combined by the SMLC with other location estimates or location data to create a hybrid location estimate in an attempt to achieve greater accuracy or location yield. These other location estimates can include those acquired by mobile-based techniques (EOTD, OTDOA, ECID, Downlink TDOA) or network-based techniques (Cell-ID, Cell-ID with time or power based ranging, Uplink TDOA, Uplink AoA, TDOA/AoA hybrids).

Figure 6:
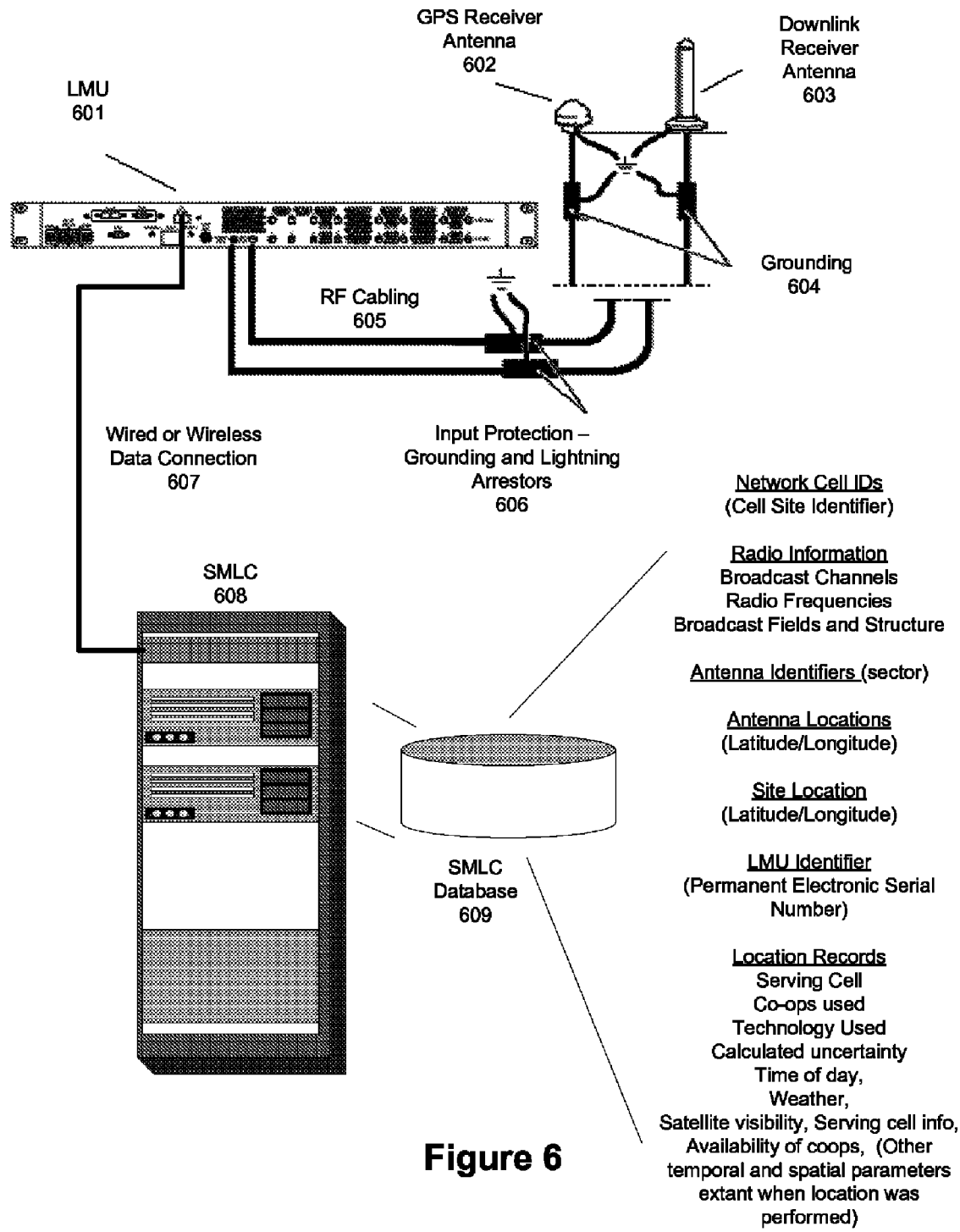
FIG. 6 depicts an illustrative example of a wireless location system as implemented in a representative wireless communications system, in this example a dual-mode GSM-UMTS network.

FIG. 6 schematically depicts an exemplary deployment of an overlay WLS comprising an LMU 601; GPS receiver antenna 602; downlink receiver antenna 603; grounding 604 and input protection 606 needed to safely interface the LMU 601 to the exterior mounted antennae 602, 603; SMLC 608 and SMLC database 609; and radio frequency cabling 605. As shown, the LMU 601 is connected to the SMLC 608 via a wired or wireless connection 608, which carries TCP/IP packet-based communications. The SMLC 608 hosts the SMLC Database 609, which contains the network cell identifiers, network antenna identifiers, network antenna locations, LMU (cell) locations, and LMU identifiers.

The SMLC 608 also stores, or is coupled to, a database of location records (e.g., the SMLC database 609). This database can be used to predict the quality-of-service for a location application based on the mobile device or network supplied cell-ID and proximity information (such as CGI+TA in GSM or CI+RTT in UMTS for example) prior to signal collection and/or location calculation. This same database can be used as described herein to hold the radio and network parameters generated by manual entry, downloading from the OSS, or developed from the GPS and/or downlink receiver subsystems. For the Location of femto-cells in a wireless communications network, the SMLC 608 would collect network cell identifiers and network antenna identifiers and develop network antenna locations (femto-cell locations) for inclusion into the SMLC database 609.

Figure 7:
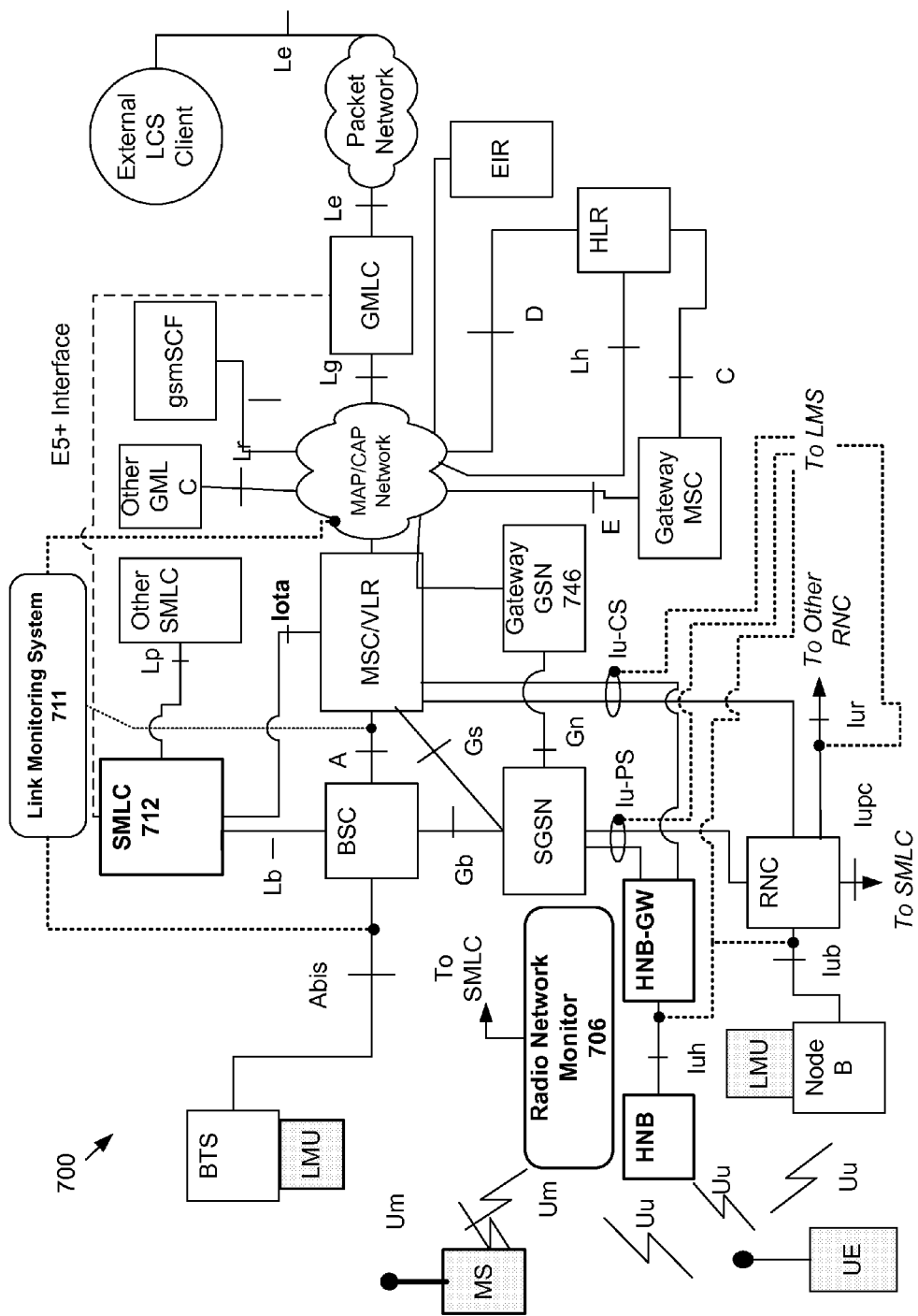
FIG. 7 shows a representative mobile communications network wherein an embodiment of the present invention may operate. In particular, this figure depicts the architecture of an illustrative network reference model using the GERAN/UTRAN standard model.
Figure 7A:
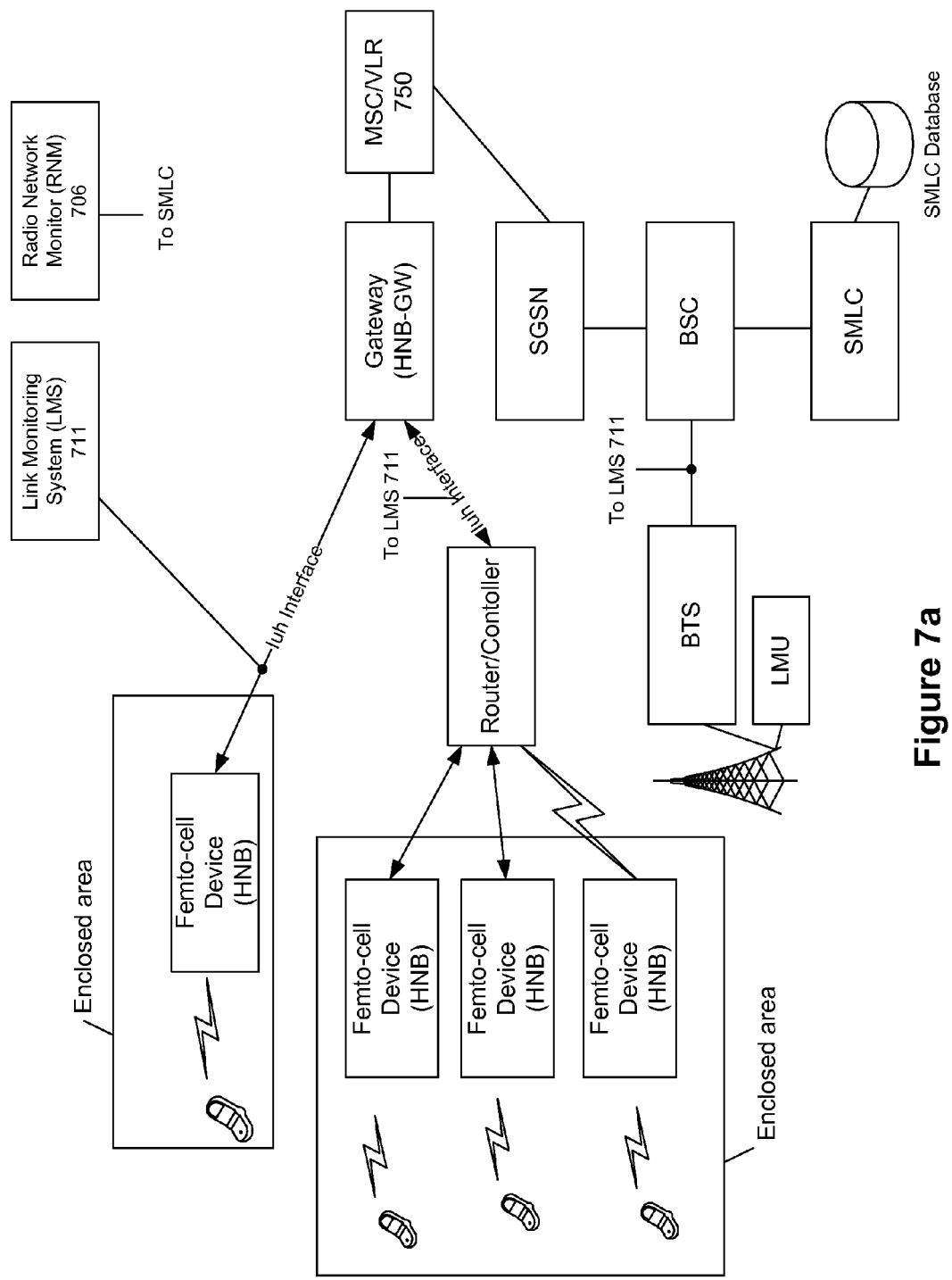
FIG. 7a schematically depicts an exemplary embodiment of a system for locating femto-cell devices as disclosed herein.

FIG. 7 shows the architecture of an illustrative network reference model (NRM) 700, using the GERAN/UTRAN standard NRM. The standardized NMR has been enhanced with pre-standard, optional, and non-standard components (highlighted in FIG. 7) that include a Radio Network Monitor (RNM) 706, a Link Monitoring System (LMS) 711, the Iota interface, the femto-cell (Home Node B (HNB), the femto-cell gateway (the Home Node B gateway (HNB-GW) and the Iuh interface between the HNB and HNB-GW. The Home NodeB (HNB) is a consumer installed, plug-and-play base station intended to connect to an existing wired or wireless broadband service for backhaul. The HNB is designed to provide wireless radio coverage for standard mobile devices within a home or office. HNBs incorporate the capabilities of a standard NodeB as well as limited radio resource management functions similar to those of a Radio Network Controller (RNC). Handover between the wide-area radio network and the HNB is supported. The HNB Gateway is the concentrator for the distributed HNB base stations. Deployed by the wireless communications network provider in the core wireless services network, the HNB-GW communicates with multiple HNB via the Iuh interface. The HNB-GW then passes traffic onto the switched circuit network (via the MSC) via the Iu-CS interface and packet data streams to the packet network (via the SGSN) via the Iu-PS interface.

The Iota interface is an enhancement from the existing standardized interfaces shown in FIG. 7. Using the Iota, the wireless communications system (WCS) can signal the wireless location system (WLS) (in this case the SMLC) when triggers (e.g. dialed digits, subscriber ID, or mobile ID) are met. Using the Iota interface, the WLS can signal the WCS for radio information and when an inter-RAT handoff is required. The Iota interface is a set of capabilities and not necessarily a direct wired interface; for this illustrative dual-mode network the Iota interface is shown as joining the SMLC to MSC, but in actual implementation, this interface could easily connect the MSC to the MPC, the GMLC, the gsmSCF or any intelligent peripheral on the Wireless Intelligent Network. A preferred implementation of the Iota interface is as a non-standard (or enhancement of a standardized) digital packet interface using a extension of the existing Wireless Intelligent Network protocols (IS-41, WIN, CAMEL) to interconnect the MSC and the SMLC. Use of the Iota interface allows the MSC to quickly query the SMLC for location and allows the SMLC to request idle mobile locations (page of idle mobile), channel and cell information for a mobile, and request an inter-Radio Access Technology (RAT) handover. Use of a modified Wireless Intelligent Network protocol allows the SMLC to communicate with multiple MSCs in the case where an inter-system inter-Radio Access Technology (RAT) handoff is needed. Some capabilities of the Iota interface already exist in the ETSI/ANSI IS-41 E2 interface as defined in Joint Standard 36 (J-STD-036) "Enhanced Wireless 9-1-1 Phase 2".

The Radio Network Monitor (RNM) 706 is a wideband multi-channel radio receiver, effectively a bank of ad hoc tunable narrowband receivers, tunable to both the uplink and downlink channels anywhere in the frequency band. The RNM was initially implemented on a commercial TruePosition Location Mobile Unit radio receiver platform (an embodiment of the LMU was previously described in U.S. Pat. No. 6,782,264 as the alternative narrowband embodiment of the receiver module for the SCS). The RNM uses its radio receivers to collect signaling to trigger the wireless location system. The RNM and its operations, capabilities and functionality is described in more detail in U.S. application Ser. No. 11/150,414, filed on Jun. 10, 2005, entitled "Advanced Triggers For Location-Based Service Applications In A Wireless Location System".

The LMS is an improvement to the Abis monitor described in U.S. Pat. No. 6,782,264, Aug. 24, 2004, "Monitoring Of Call Information In A Wireless Location System", and is able to monitor not only the Abis and A interfaces, but also the GSM-MAP, Iub, Iu-PS and Iu-CS interfaces and in some cases the Iur interface. The LMS can be implemented, with modifications, on the same hardware/software chassis as the Abis Monitor (a set of custom applications with unmodified Agilent Access7 software application running on a cluster of Intel TSEMT2 or TSRLT2 UNIX servers). The LMS passively monitors message traffic within the wireless communications system as to trigger the wireless location system based on pre-set criteria. See U.S. application Ser. No. 11/150,414, filed on Jun. 10, 2005, "Advanced Triggers For Location-Based Service Applications In A Wireless Location System"; U.S. application Ser. No. 11/198,996, filed on Aug. 8, 2005, "Geo-Fencing In A Wireless Location System"; and U.S. Pat. No. 6,119,000, Sep. 12, 2000, "Method And Apparatus For Tracking Identity-Code Changes In A Communications System," for additional detail on LMS functionality.

The network 700 includes a Serving Mobile Location Center (SMLC) 712. The RNM 706 is the primary component that can be deployed at a carrier's cell sites. The RNM 706 is preferably implemented as a distributed network of radio receivers capable of receiving RACH and SDCCH messages for autonomous generation of location services. The RNM tunes to directed frequencies to gather data for the system. The RNM 706 can then forward the collected data to the SMLC 712. All RNMs 706 in a network are preferably time- and frequency-synchronized through the use of the Global Positioning Satellite (GPS) constellation (not shown).

The SMLC 712 is preferably a high volume location-processing platform. The SMLC 712 contains U-TDOA and multipath mitigation algorithms for computing location, confidence interval, speed, and direction of travel. The SMLC 712 can also determine which wireless phones to locate based upon triggering from the Link Monitoring System (LMS) 711 or requests from the Lb interface to an infrastructure vendor's Base Station Controller (BSC) (or MSC in some cases as the Ls interface). The SMLC 712 is typically co-located at the operator's BSC but can also be remotely distributed. The primary functions of the SMLC 712 are to receive reports on signal detection from the RNMs 706, to perform location processing, and to calculate the location estimate for each signal. The SMLC 712 manages the network and provides carrier access to location records. The SMLC 712 is responsible for the collection and distribution of location records. The SMLC 712 also maintains configuration information and supports network management.

The LMS 711 continuously monitors all Abis signaling links (and in some cases A-interface links and GSM Mobile Application Protocol (GSM-MAP) interface) in a network to which the LMS 711 is connected. A function of the LMS 711 is to capture messages in the call (e.g., a GSM voice conversation, and SMS transaction or a GPRS data session) and SMS setup procedure, mid-call control messages, and call termination and release messages for MSs and or UEs. The LMS 711 then forwards the data contained in those messages to the SMLC 712 for subsequent location processing.

The GSM service control function (gsmSCF), also called a service control point (SCP), contains database and logical rules for providing non-call oriented services to a subscriber. The gsmSCF connects to the MSC(s) and GSN(s) via CAMEL Application Part (CAP) connections over the SS7 network. The GSM Mobile Application Protocol (GSM-MAP) is the communications medium for call-related control services on the wired part of a wireless network. The GSM-MAP exists to provide services like automatic roaming, authentication, location services intersystem hand-off, and short message service routing on a GSM or UMTS network. All wireless network elements such as the MSC, HLR, VLR (shown here as part of the MSC), GMSC, EIR, GMLC, and gsmSCF use this messaging protocol to communicate among each other. The GSM-MAP resides on the international Signaling System 7 (SS7) network (the MAP-CAP network).

The Gateway Mobile Location Center (GMLC) is defined by 3GPP standards as the clearinghouse for location records in a GSM/GPRS/UMTS network. The GMLC serves as a buffer between the tightly controlled SS7 network and the public internet Authentication, access control, accounting, and authorization functions for location-based services are commonly resident on or controlled by the GMLC.

The Le interface is an IP-based XML interface originally developed by the Location Interoperability Forum (LIF) and then later standardized by the 3rd Generation Partnership Program (3GPP) for GSM (GERAN) and UMTS (UTRAN). The Location-based services (LBS) client is also known as a LCS (Location Services). The LBS and LCS are software applications and services uniquely enabled to use the location of a mobile device.

The E5+ interface is a modification of the E5 interface defined in the Joint ANSI/ETSI Standard 036 for North American E9-1-1. The E5+ interface connects the SMLC and GMLC nodes directly allowing for push operations when LMS 711 or RNM 706 triggers are used by the wireless location system with either network acquired information (cell-ID, NMR, TA, etc) or via TDOA and/or AoA (angle of arrival) performed by specialized receivers.

User equipment (UE) can be defined as equipment such as a UMTS mobile device. NodeB is the Universal Mobile Telephony System Radio Access Network (UTRAN) network interface to the UMTS radio interface. The Radio Network Controller (RNC) enables autonomous radio resource management (RRM) by UTRAN. The RNC performs the same functions as the GSM BSC, providing central control for the RNS elements (RNC and Node Bs). The RNC handles protocol exchanges between Iu-PS, Iu-CS, Iur, and Iub interfaces and is responsible for centralized operation and maintenance of the entire radio network system. The RNC can communicate with other RNCs directly via the standardized Iur interface when necessary.

The Serving GPRS Support Node (SGSN) monitors the location of individual GPRS capable Mobile Stations and performs basic security functions and access control functions. The SGSN can serve both the Global System for Mobility (GSM) radio access network (GERAN) and UMTS radio networks.

The Gateway GPRS Support Node (GGSN) acts as a system routing gateway for the GPRS network. The GGSN is a connection to external packet data networks (e.g., public internet) and performs the task of billing, routing, security firewalling, and access filtering. The Gateway MSC (GMSC) acts as a bridge for roaming subscribers to visited MSCs in other operator's networks. Both control signaling and traffic trunks are setup via the GMSC.

The Um is the GSM radio interface. The Uu is the UMTS radio interface. The Iub interface is located on a UMTS network and is found between the RNC (Radio Network Controller) and the NodeB. The Iupc interconnects the UMTS RNC with the SMLC (also called the SAS) in the UMTS network for location estimation generation. The Iu-CS (Circuit Switched) interface connects the UMTS RNC with the circuit switched communications oriented network (the MSC). The Iu-PS (Packet Switched) interface connects the UMTS RNC with the packet switched communications oriented network (SGSN). The Gb interface interconnects the BSC with the SGSN allowing for routing of GPRS communications.

The Gn interface is a GPRS network packet data interface which is located between the SGSN and GGSN. The Gs interface is a GPRS system interface located between the SGSN and the MSC. The Gr (not shown) interface is a GSM-MAP interface which is located between the SGSN and the Home Location Register (HLR) carried on the SS7 network.

As described in U.S. Pat. No. 6,782,264, it is possible to monitor the base transceiver station (BTS) to base station controller (BSC) link (e.g., the Abis link) for triggering messages and information fields. A passive network monitor, called the AMS (Abis Monitoring System) in the '264 patent and exemplified by monitoring the GSM Abis interface, has been extended in accordance with the present invention and is now called the Link Monitoring System, or LMS. The Link Monitoring System (LMS) 711 can monitor multiple cellular network data links simultaneously, scanning for data of interest, and can detect particular messages or data fields within messages. Setting or tasking of messages or data fields of interest can take place at any time. When a match occurs, the LMS 711 may be further triggered to perform a pre-set action, such as a write to storage memory or forwarding of the triggering message and (or) data fields to another system node.

The Radio Network Monitor 706 extends the concept of passive monitoring for location triggering information and messaging to the radio air interface. The RNM 706 can detect and monitor both uplink (mobile device to BTS or NodeB) and downlink radio communications.

The terms Mobile Device, Mobile, Mobile Phone or Mobile Subscriber Unit refers to the MS or UE in IEEE802.16e/m, GSM, UMTS, or multi-mode (such as GSM/UMTS networks) networks. The MS in GSM consists of two distinct elements, the ME (Mobile Equipment) and the SIM (Subscriber Identity Module). The UE in UMTS is a combination of ME (Mobile Equipment) and SIM/U.S.IM (Subscriber Identity Module/UMTS Subscriber Identity Module).

A Mobile device may allow multi-mode or multi-radio operations to access multi-technology wireless communications networks or disparate wireless communications networks using disparate radio access technologies. As shown in this FIG. 7 the mobile device could contain dual mode functionality of the GSM Mobile Station (MS) and UMTS User Entity (UE). The Mobile Device would typically implement both functionalities using common circuitry and computational faculties.

Femto-Cell Device (FIGS. 7*b* and 7*c*)

The femto-cell base station (or home NodeB in 3GPP terminology) is a miniature, all digital, wireless base station. The base station comprises several functional blocks: the radio block 7010, the baseband block 7020, and the communications block 7030 (see FIG. 7*b*). In addition, as shown, the base station includes a location subsystem 7000, which includes a triggering mechanism 7002. The example shown in FIG. 7*c* is for an FDD system that has separate paths for the transmitted and received paths. A TDD system would include additional circuitry in the RF block to interleave the co-existing transmit and receive time periods on the same antenna.

As shown in FIG. 7*c*, the receive path includes an antenna subsystem of one or more antennae. The received radio signal is converted by the antenna into an electrical signal which is sent through a bandpass filter and a low noise amplifier, and then is downconverted to an intermediate frequency (I/F) via an RF down converter. The incoming I/F signal is then moved to the baseband block where it is digitized by an analog-to-digital converter (A/D) and then the digital representation is moved to a lower frequency by a digital down converter (DDC). The baseband digitized signal representation is then processed by the digital signal processor (DSP) (or customized circuitry), which in the UMTS Home Node B example includes the rake receiver, finger control, symbol combination, demultiplexing, de-interleaving, decoding and potentially transcoding operations. The incoming digital data stream is then passed to the communications block, which controls the data backhaul and operations, administration, maintenance, and provisioning interface. The communications block bridges the incoming data stream to the physical digital backhaul media and routes based upon the provisioned settings to the network operator gateway.

The transmit path begins at the communications block where the outgoing digital data stream is provided by the network operator gateway across the physical digital backhaul media. The communications block bridges the incoming data stream providing it to the baseband block. A digital signal processor (or customized circuitry) and digital-to-analog converter process the outgoing data stream into a intermediate frequency signal. In the UMTS Home Node B example, baseband block operations include encoding, interleaving, multiplexing, channelization, spreading and modulation of the incoming digital data stream.

The outgoing I/F signal is multiplied to reach the correct frequency by the RF up converter and then amplified by the power amplifier (PA) to the correct transmit power. The transmit antenna subsystem then converts the electrical signal to radio waves using one or more antenna.

Triggering and Tasking for Femto-Cell Location

Figure 8:
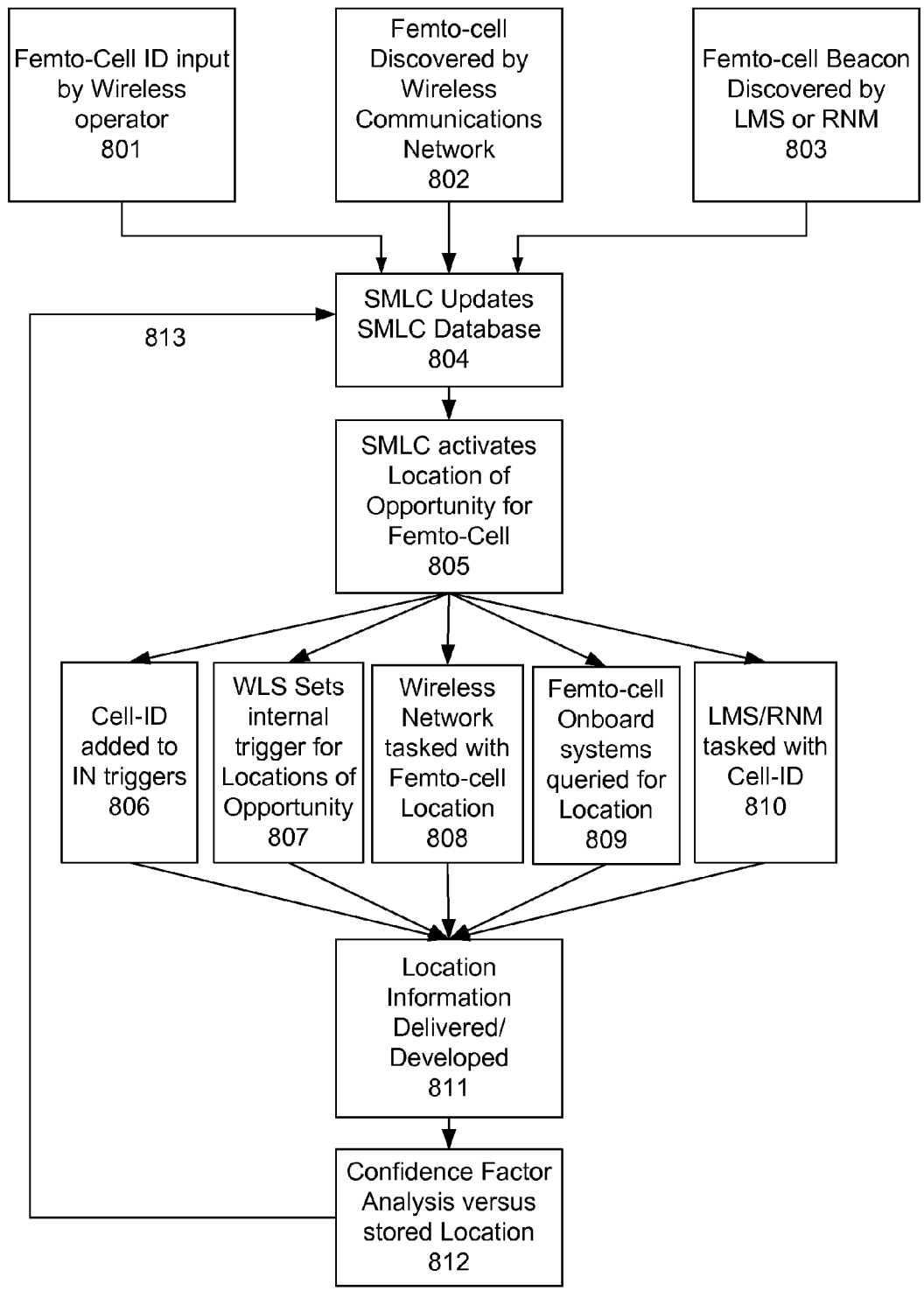
FIG. 8 illustrates a recursive femto-cell location procedure involving triggering and tasking of femto-cell location.

As shown in FIG. 8, the SMLC may be passed cell information 801 manually or from a wireless network operator's Operations Support System (OSS). The OSS is a network management system supporting network configuration, fault monitoring, performance evaluation, security auditing and event detection, optimization, etc. The femto-cell may also be discovered via the Wireless Communications Network 802 via analysis of call detail records or if an LMS or RMS facility is available, discovered 803 by monitoring of Wireless Communications Network link traffic for new cell-IDs within messages related to call events.

Once a femto-cell ID has been determined and the cell-ID and any associated location information (including a cell location quality threshold) stored by the SMLC database 804, the SMLC activates a Location of Opportunity 805 capability where, dependent on the deployed equipment and operator preferences, consecutive, parallel, or periodic location attempts may be made for the femto-cell. Cell-ID triggers may be added via a Wireless Intelligent Network facility 806 (via the Iota interface or similar WIN/CAP interface). Alternately, the WLS may set internal triggers for the femto-cell Cell-ID 807 so that matter-of-course locations performed on mobiles may be examined for the femto-cell ID. If the femto-cell is enhanced with a mobile station or user equipment transceiver, the wireless network may be queried 808 to begin a mobile-based location estimate. If the femto-cell has been enhanced with a mobile station or user equipment receiver, the femto-cell onboard systems may be queried for a location 809. Finally, the WLS may set Cell-ID triggers in the RNM or LMS 810, so that detection of the cell-ID will provoke the WLS to attempt a location.

Once the femto-cell's location information, whatever the source, has been delivered to the SMLC, a location can be calculated 811. This calculation may attempt to include an offset distance separating a proxy mobile location (see U.S. application Ser. No. 12/269,000, filed on even date herewith, entitled "Femto-Cell Location by Proxy) from the femto-cell device in question. A location confidence factor may also be calculated in this step 811.

The calculated location is then compared to the location present in the SMLC database for the current femto-cell ID 812. If the calculated confidence factor is better than that of the cell location quality, then the SMLC database may be automatically updated 813 or the operator OSS informed of the determined cell location and location error factor.

In cases where femto-cell location is provided or the femto-cell location is autonomously developed, the SMLC can use location resources to occasionally (or at operator request) confirm, and re-confirm, the femto-cell location and alert the network operator of changes. In cases where the femto-cell ID is given but no location is provided, the SMLC may allocate location, and where available link monitoring, resources in an effort to localize the identified femto-cell. Once the wireless location system has located the femto-cell via direct or proxy means, analysis of the confidence factor 812 (a measure of how good the location actually is) based on factors such as cell size, number of sectors, received power levels, innate precision of the location technique used may be performed. If the confidence is too low (that is the location of the femto-cell is not known to the desired accuracy), then the WLS may attempt over time to re-locate the femto-cell to a more accurate level. This re-location or confirmation of location can be performed using increasingly precise wireless location technology as available.

Femto-Cell Location for RF Planning and Coordination

Femto-cells have some deployment issues. One such issue is the behavior of autonomous, plug-and-play femto-cells to function in the overall macro-cell radio frequency plan with no end-user or installer inputs. In other words, potentially hundreds of femto-cells per macro-cell or millions per radio communications network must interact with the larger cellular infrastructure in the RF domain, and in doing so the femto-cells and/or the wider wireless communications network should act to mitigate the potential (or ongoing) interference with other femto-cells and with the surrounding macro-cell radio communications network while preserving the benefits of frequency and radio channel reuse. This frequency management is necessitated by the quality of service expectations of the user population and regulatory agencies.

Unlike currently deployed IEEE802.11 WiFi data networks made of autonomous access points working in unregulated radio spectrum subject only to local regulatory compliance, wireless communications systems using femto-cells in reserved spectrum will be subject to regulations such as the FCC E9-1-1 Phase 1 and Phase 2 mandates. Dual mode WLAN and cellular protocol femto-cells will have to meet both sets of regulatory obligations. It is this quality-of-service expectation and regulation that makes femto-cell air interface reliability and location capability a requirement.

To increase capacity, wireless network providers will want femto-cells using the same channel as their macro cell radio access network. This reuse can inevitably cause interference: femto-versus-macro cell, femto-versus-femto versus macro, etc. Ultimately, the result could be downgraded network performance, awkward inter-BTS handoffs, and a burden on the core network in terms of cell management. Currently RF planning and interference reduction includes specific, technical solutions from femto-cell vendors. Some femto-cell vendors have designed their femto-cell products to automatically select non-interfering channels and adjust their transmit power to avoid interference, increasing the cost and complexity of the femto-cell. Even so, interference with neighboring or geographically proximate femto-cells must be expected.

One way to avoid femto-cell interference would be for the wireless radio access network provider to acquire new radio spectrum (or segregate existing spectrum) to be used primarily for femto-cell deployments so there is no interference possible between the isolated femto-cells and the wide area communications network. With distinct spectrums, deployment of femto-cells is possible with no interference (and thus no RF planning is required for integration) with the wide area radio access network.

Some femto-cell vendors have integrated a GNSS (such as a Navstar GPS) receiver within the BTS equipment to locate and in some cases lock the femto-cell when it is moved to a different location or country. This GNSS location receiver is of marginal utility, as the receiver is often unable to obtain the indoor position of the femto-cell because of attenuation of the satellite signal by the surrounding structure.

A lower cost femto-cell solution for radio-frequency management is proposed using available wireless location technologies to derive the femto-cell location and provide that location and RF data to radio network planning and monitoring tools. This same approach to location allows the femto-cell to provide location for emergency services.

Femto-cell location is also vital for conformance with the geographic coverage requirements inherent in licensed spectrum. A femto-cell moved outside the wireless network provider's licensed area should not be allowed to interfere with another carrier's radio access network. A discovered location prevents this from occurring. As an added benefit, femto-cell location allows for small and regional wireless network providers to offer and use femto-cells.

Finally, in a paper entitled *"EFFECTS OF USER-DEPLOYED, CO-CHANNEL FEMTOCELLS ON THE CALL DROP PROBABILITY IN A RESIDENTIAL SCENARIO,"* The 18th Annual IEEE International Symposium on Personal, Indoor and Mobile Radio Communications (PIMRC'07), by Lester T. W. Ho and Holger Claussen, the authors comment on the effects of femto-cell deployments on the RF environment and quality of service (QoS). The reported study does not use femto-cell location but rather examines auto-configuration of the femto-cell RF parameters.

In contrast to the auto-configuration approach, location of the femto-cell device provides several advantages, including:

1) Location allows conventional planning tools to be used.
2) Pre-initialization RF planning can provide better results than auto-configuration.
3) Femto-cell to femto-cell handoff is enabled by location.

Femto-Cell Location for Commercial Location Services

Commercial location-based services (LBS) require location of the mobile device. For mobile's using a femto-cell for connection to the wireless communications network, location using downlink mobile-based techniques or GNSS techniques is problematic since femto-cells are designed to serve areas blocked or severely attenuated by structural materials both the macro-cellular network and GNSS satellite signals. Also since femto-cells may be end user installed and re-installed, a static location programmed into the femto-cell at installation may be unavailable or simply incorrect. Using a discovered location (via the described uplink and downlink techniques) of the femto-cell as a mobile device location allows for use of commercial location-based services and applications (such as mobile search, localized advertising, or mobile social networking) by users served by the femto-cell. As shown in FIG. 8b, the SMLC, after population of the SMLC database 804, can respond to a Commercial Location-based Services (LBS) Location Request 817 by Querying the Wireless Communications Network 813 for the serving cell ID and channel information as is the nominal case. In many cases, the serving cell-ID may be delivered in the actual request message. The SMLC uses the serving cell data (whatever the source) to query the SMLC database. If the serving cell is determined to be a femto-cell and the femto-cell has been located to an accuracy above an acceptable (via the location quality-of-service (QoS) requested) threshold, then the SMLC may abort the LBS location attempt and return the serving femto-cell location 818 (and optionally the femto-cell location error estimate and the femto-cell range error estimate based on any available time or power based measurements between the mobile and femto-cell). If the SMLC database query shows that the serving cell is not a femto-cell, then normal location processing may be performed 816.

Femto-Cell Location for Emergency Services

Location of callers using a femto-cell is required under the FCC's E911 Phase I and Phase II mandates. Since the femto-cell may be end user installed and re-installed, a static location programmed into the femto-cell at installation may be unavailable or simply incorrect.

Since a femto-cell has a limited coverage area and is designed to be used to provide that coverage to areas possibly blocked by structural materials from the macro-cellular network coverage, location of the femto-cell (cell-ID) should satisfy both the E911 Phase I and Phase II mandates. Use of the time-based ranging technique (examples include cell-ID with timing advance (for GSM), serving-one-way-delay (for CDMA), or Cell-ID with ½ Round Trip Time (RTT) (for UMTS)) can be used to improve the Cell-ID based femto-cell location once the latitude and longitude of the femto-cell is discovered.

Figure 8A:
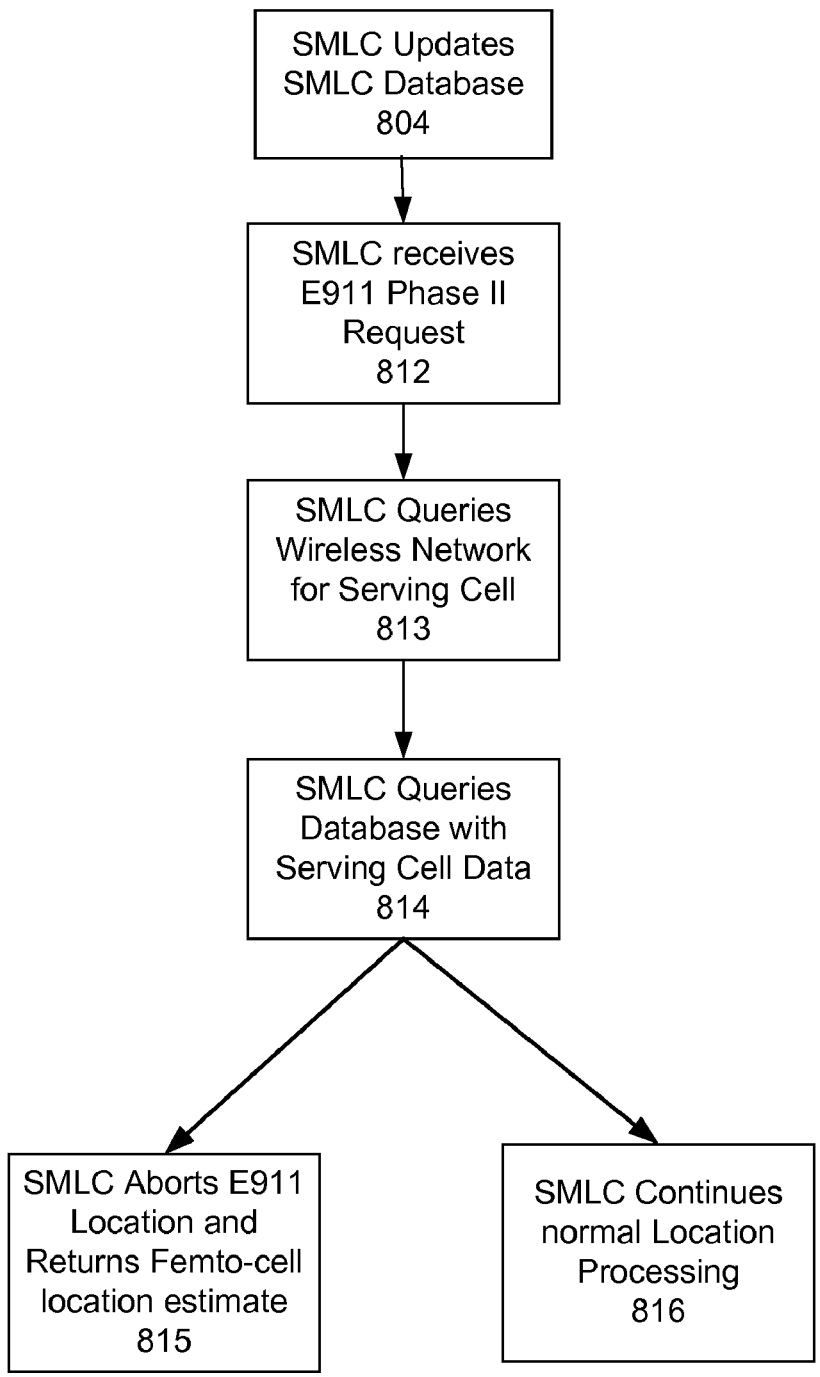
FIG. 8a illustrates a procedure for handling an emergency services location request.
Figure 8B:
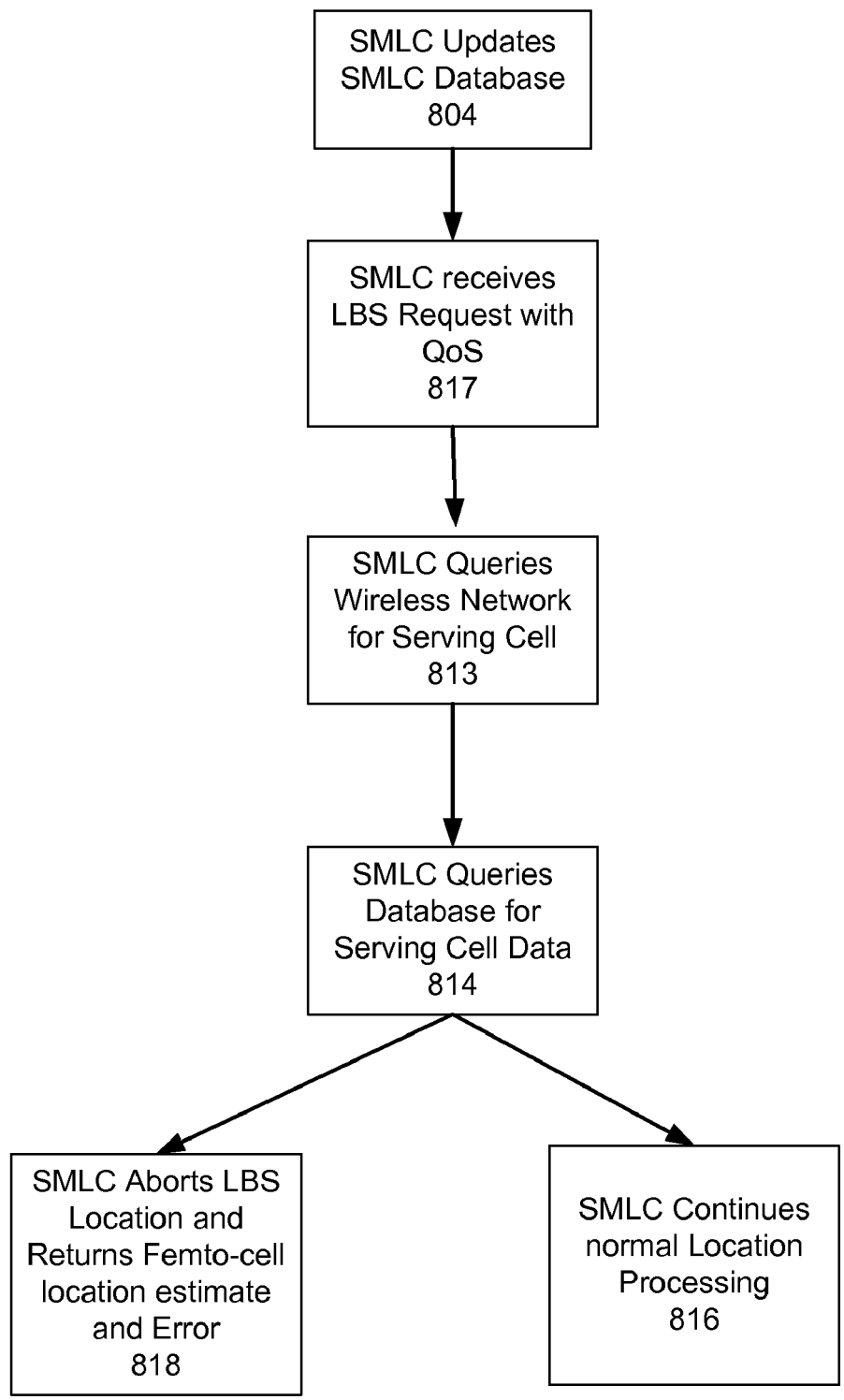
FIG. 8b illustrates a procedure for handling a location based services (LBS) request.

As shown in FIG. 8a, the SMLC (after initial population of the SMLC database) can respond to an Emergency Services Location Request 812 by Querying the Wireless Communications Network 813 for the serving cell ID and channel information as is the nominal case. In many cases, the serving cell-ID may be delivered in the actual request message. The SMLC uses the serving cell data (whatever the source) to query the SMLC database 814. If the serving cell is determined to be a femto-cell and the femto-cell has been located to an accuracy above an acceptable (to the PSAP or Regulatory Agency) threshold, then the SMLC may abort the location attempt and return the serving femto-cell location 815 (and optionally the femto-cell location error estimate and the femto-cell error estimate and any ranging provided by time or power based measurements between the mobile and femto-cell). If the SMLC database query 814 shows that the serving cell is not a femto-cell, then normal location processing may be carried out 816.

Also, under the provisions of the 2006 WARN Act (the Warning, Alert and Response Network (WARN) Act as part of the larger port security bill, the Safe Accountability for Every Port Act of 2006 (SAFE Act)), the location of callers using a femto-cell can be provided for emergency notification (reverse 9-1-1) services.

Figure 8C:
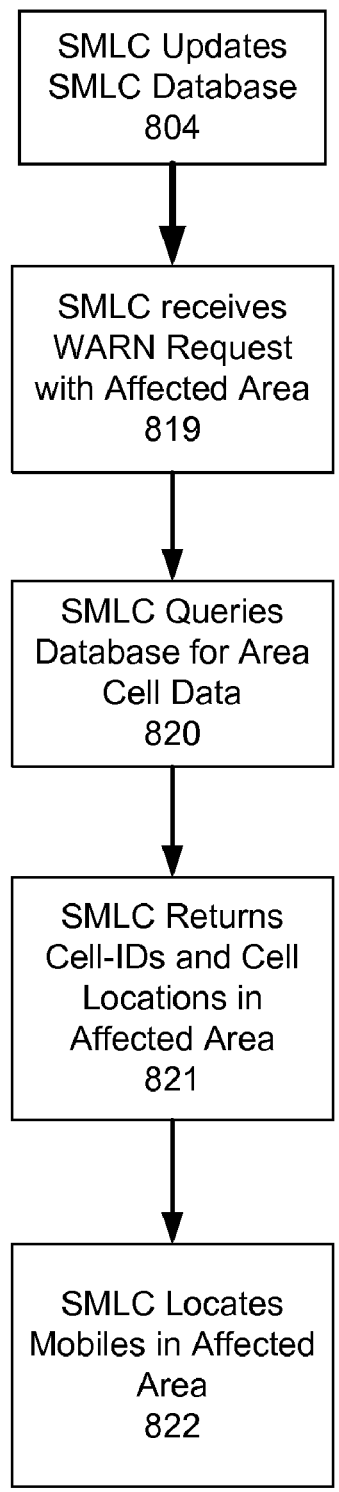
FIG. 8c illustrates a procedure for handling a WARN (Warning, Alert and Response Network) request.

As shown in FIG. 8c, the SMLC (after population of the SMLC database) can respond to an WARN Request by querying the WLS for the serving cell IDs in an affected area. The SMLC would then query the SMLC database 820 for Cell-IDs in the geographically described affected area and geographic locations of the cell sites, both macro and femto cells, in the affected area would be returned 821. The SMLC may also be tasked to provide more accurate (than cell-ID) location on mobile stations in the affected area and/or provide identification on mobiles within the affected area. Using, e.g., wide area localization 822, as described in U.S. patent application Ser. No. 11/150,414, "Advanced Triggers For Location-Based Service Applications In A Wireless Location System", mobiles within the affected area can be identified and located to varying degrees of accuracy.

Femto-Cell Location Using Multiple Location Algorithms

Figure 9:
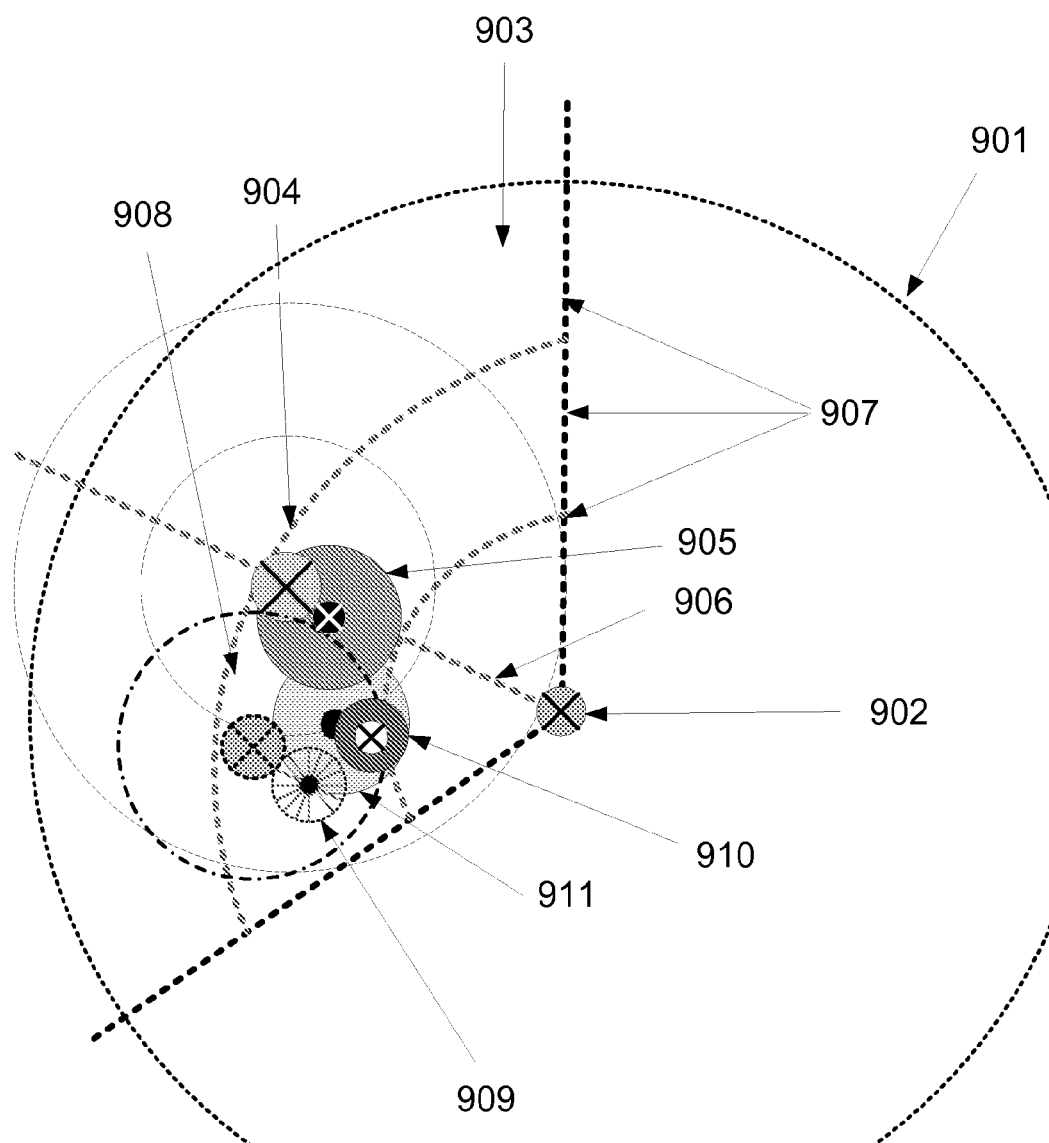
FIG. 9 graphically illustrates the combination of locations in developing a more accurate femto-cell location using the proxy location technique.

FIG. 9 depicts location of the femto-cell using multiple location algorithms. This location of opportunity approach is possible since the femto-cell is nominally stationary and powered-on for long periods. Since the SMLC database stores location estimates and confidence or error factors, a histogram of location estimates can be built up over time and thus a probability distribution function composed of location estimates and error areas can be constructed. Multiple location attempts can be made simultaneously, serially, periodically or aperiodically over time.

In the FIG. 9 example, the GSM system is used as an illustrative example, but other air interfaces and networks can also use the location-of-opportunity concept. Also in this illustrative example, the femto-cell is deployed as a capacity cell underlying a larger macro-cell 901 within a single sector 902 of the Marco-cell.

Assuming an enhanced femto-cell that incorporates an enhanced downlink receiver, the high power downlink beacon from the macro-cell sector antenna will allow the femto-cell to determine its cell-ID position 902 and sector 903. Transmission of cell and sector information to the SMLC via the wired femto-cell link via the wireless telecommunication network will allow the SMLC to use databased information to compute a cell/sector on the sector bisector 906 position 904 with error estimate at ½ the sector radius from the sector antenna. If the enhanced femto-cell has a full mobile transceiver embedded and can register with the wide area communications network, then other location techniques are possible.

By registering, the enhanced femto-cell has a full mobile transceiver will have access not only to downlink beacon information, but can also determine a time and power based range from the serving cell 901. Ranging via signal strength (such as Return-Signal-Strength-Indicator (RSSSI) or by timing (such as using the GSM Timing Advance (TA), UMTS Round-trip-time (RTT) or CDMA ServingOneWayDelay) allows localization to a geographic band 907 across the sector 903. The resulting (CGI+TA, CI+RTT, etc) position estimate 905 is then centered in that geographic band 907 again on the sector bisector 906.

Since the femto-cell incorporates a full mobile transceiver and can register with the network, location via cell/sector with ranging may be made more precise by inclusion of a power-difference-of-arrival using downlink beacons from other wireless cell sites broadcasting from known positions. In GSM this cell-sector-ranging-PDOA technique is known as enhanced Cell-ID or ECID and is shown in FIG. 9 as the position and error estimate 908.

Dependent on the capabilities of the wireless communications network, the wireless location system and the femto-cell's mobile station or user equipment subsystem, mobile-based location techniques such as EOTD (for GSM), OTDOA (for UMTS), PSMM (for IS-95/IS-2000 CDMA) or AFLT (for IS-95/IS-2000 CDMA) may be available to the enhanced femto-cell. In the FIG. 9 example, a mobile device based location and error estimate is shown 909.

Dependent on the capabilities of the wireless communications network, the wireless location system and the femto-cell's mobile station or user equipment subsystem, high accuracy location techniques such as Uplink-TDOA, Uplink-AoA, hybrid TDOA/AoA, Global Navigation Satellite System (GNSS) positioning, Assisted-GNSS, or hybrid U-TDOA/GNSS may be available. In FIG. 9, the high-accuracy positioning and error estimate 910 provides the highest probability estimate of the geographic location of the enhanced femto-cell.

By combining the reported locations and creating a weighted histogram of the location estimates and error areas, an optimized femto-cell location and location error estimate 918 can be determined using probabilistic methods.

CONCLUSION

The true scope the present invention is not limited to the presently preferred embodiments disclosed herein. In many cases, the place of implementation (i.e., the functional element) described herein is merely a designer's preference and not a hard requirement. Accordingly, except as they may be expressly so limited, the scope of protection of the following claims is not intended to be limited to the specific embodiments described above.

We claim:

1. A subsystem for use by a wireless location system (WLS) in locating a femto-cell device operating in a wireless communications system, wherein the WLS includes a serving mobile location center (SMLC), a plurality of location measuring units (LMUs) in communication with the SMLC, a plurality of link monitors in communication with the SMLC, and an SMLC database in communication with the SMLC and containing cell locations and other radio aspects of the wireless communications system, the subsystem comprising:
   (a) a subsystem configured for discovering and initiating location of the femto-cell device, wherein said discovering and initiating comprises at least one of the following procedures: (a1) receiving femto-cell ID information from the wireless communications system; (a2) discovery of the femto-cell ID information via analysis of call detail records; and (a3) discovery of the femto-cell ID information via monitoring of wireless communications system link traffic for new cell-IDs within messages related to call events;

(b) a subsystem configured for storing femto-cell identification information in the SMLC database;
(c) a subsystem configured for setting a trigger for location of the femto-cell, wherein said setting a trigger comprises at least one of the following procedures: (c1) setting a femto-cell cell-ID trigger in the SMLC database via a wireless intelligent network (WIN) facility; (c2) setting an internal femto-cell cell-ID trigger in the SMLC database to indicate to the WLS that mobile station (MS) location information should be examined to identify when the femto-cell device is serving the MS; (c3) setting a femto-cell cell-ID trigger in a radio network monitor (RNM) or link monitoring system (LMS) associated with the WLS, wherein the WLS is configured such that detection of the femto-cell cell-ID provokes the WLS to attempt location of the femto-cell device;
(d) a subsystem configured for calculating the location of the femto-cell device;
(e) a subsystem configured for calculating a confidence factor relating to the calculated location of the femto-cell; and
(f) a subsystem configured for comparing the calculated confidence factor with a confidence factor stored in the SMLC database.

2. A subsystem as recited in claim 1, further comprising a subsystem configured for determining that the calculated confidence factor is better than the stored confidence factor, and in response thereto updating location information in the SMLC database.

3. A subsystem as recited in claim 1, further comprising a subsystem configured for determining that the calculated confidence factor is better than the stored confidence factor, and notifying an operator of the wireless communications system of an error in the stored location information associated with the femto-cell device.

4. A subsystem as recited in claim 1, further comprising a subsystem configured for determining that the calculated confidence factor is below a prescribed value and attempting to obtain a more accurate location of the femto-cell device.

5. A subsystem as recited in claim 1, wherein the location of the femto-cell device is calculated by the femto-cell device.

6. A subsystem as recited in claim 1, wherein the location of the femto-cell device is calculated by the WLS.

7. A subsystem as recited in claim 6, wherein the location of the femto-cell device is determined using uplink transmissions during a handover procedure.

8. A system, comprising:
a wireless communications system (WCS), wherein the WCS is associated with a serving mobile location center (SMLC) and an SMLC database containing network cell identifiers, network antenna identifiers, and network antenna locations;
a femto-cell device;
a location subsystem configured to acquire information identifying an estimate of the geographic location of the femto-cell device;
a communications subsystem configured to provide for communication between the WCS and the femto-cell device, including communicating location information to the WCS for storage in the SMLC database together with location records including femto-cell locations and identifiers; and
a triggering mechanism configured to actuate the location subsystem so as to cause the location subsystem to determine the location estimate for the femto-cell device;
wherein the SMLC is configured to use location resources to confirm the femto-cell location estimate and to determine a confidence factor representing a measure of the quality of the location estimate based on factors including cell size, number of sectors, and received power levels, and to attempt to re-locate the femto-cell if the confidence factor indicates that the location estimate is inadequate.

9. A method for use by a wireless location system (WLS) in locating a femto-cell device operating in a wireless communications system, wherein the WLS includes a serving mobile location center (SMLC), a plurality of location measuring units (LMUs) in communication with the SMLC, a plurality of link monitors in communication with the SMLC, and an SMLC database in communication with the SMLC and containing cell locations and other radio aspects of the wireless communications system, the method comprising:
discovering and initiating location of the femto-cell device, wherein said discovering and initiating comprises at least one of the following procedures: receiving femto-cell ID information from the wireless communications system; discovery of the femto-cell ID information via analysis of call detail records; and discovery of the femto-cell ID information via monitoring of wireless communications system link traffic for new cell-IDs within messages related to call events;
storing femto-cell identification information in the SMLC database;
setting a trigger for location of the femto-cell, wherein said setting a trigger comprises at least one of the following procedures: setting a femto-cell cell-ID trigger in the SMLC database via a wireless intelligent network (WIN) facility; setting an internal femto-cell cell-ID trigger in the SMLC database to indicate to the WLS that mobile station (MS) location information should be examined to identify when the femto-cell device is serving the MS; setting a femto-cell cell-ID trigger in a radio network monitor (RNM) or link monitoring system (LMS) associated with the WLS, wherein the WLS is configured such that detection of the femto-cell cell-ID provokes the WLS to attempt location of the femto-cell device;
determining the location of the femto-cell device and providing location information to the SMLC database;
calculating a confidence factor relating to the determinded location of the femto-cell device;
comparing the calculated confidence factor with a confidence factor stored in the SMLC database;
determining that the calculated confidence factor is better than the stored confidence factor; and
taking a further action including at least one of: (a) notifying an operator of the wireless communications system of an error in the stored location information associated with the femto-cell device; and (b) updating location information in the SMLC database.

10. A method as recited in claim 9, further comprising determining that the calculated confidence factor is below a prescribed value and attempting to obtain a more accurate location of the femto-cell device.

11. A method as recited in claim 9, further comprising use of the femto-cell location for radio freqeuncy (RF) planning and coordination.

12. A method as recited in claim 11, wherein said RF planning and coordination includes preventing the femto-cell device from interfering with other cells when the femto-cell device is re-located.

13. A method as recited in claim 9, further comprising use of the femto-cell location for emergency services.

14. A method as recited in claim 9, further comprising use of the femto-cell location for warning, alert and response network (WARN) services.

15. A method as recited in claim 9, further comprising use of the femto-cell location for commercial location services.

16. A method as recited in claim 9, wherein the wireless communications system comprises, in addition to said femto-cell, a plurality of macro-cells and at least one micro-cell.

17. A method as recited in claim 16, wherein said femto-cell device is deployed as an under-lay femto-cell situated within a radio footprint of a single macro-cell.

18. A method as recited in claim 16, wherein said femto-cell device is deployed as a border femto-cell situated within the radio footprints of multiple macro-cells.

19. A method as recited in claim 16, wherein said femto-cell device is deployed as a remote femto-cell situated outside the radio footprint and coverage areas of all macro-cells of the wireless communications system.

20. A method as recited in claim 9, wherein the location of the femto-cell device is calculated by the femto-cell device.

21. A method as recited in claim 20, wherein the femto-cell device is a Global Navigation Satellite System (GNSS)-capable device comprising a receiver capable of receiving GNSS satellite signals.

22. A method as recited in claim 9, wherein the location of the femto-cell device is calculated by the WLS.

23. A method as recited in claim 22, wherein the location of the femto-cell device is determined using uplink transmissions during a handover procedure.

* * * * *